(12) United States Patent
Peterson et al.

(10) Patent No.: US 12,549,544 B2
(45) Date of Patent: *Feb. 10, 2026

(54) CONSENT-BASED AUTHORIZATION SYSTEM FOR TAXATION AND CONSUMER SERVICES

(71) Applicant: Identity Reel, LLC, Layton, UT (US)

(72) Inventors: Brandon Peterson, Layton, UT (US); Andrew McDermont, Layton, UT (US)

(73) Assignee: Identity Reel, LLC, Layton, UT (US)

( * ) Notice: Subject to any disclaimer, the term of this patent is extended or adjusted under 35 U.S.C. 154(b) by 632 days.

This patent is subject to a terminal disclaimer.

(21) Appl. No.: 17/902,719

(22) Filed: Sep. 2, 2022

(65) Prior Publication Data

US 2022/0417242 A1    Dec. 29, 2022

Related U.S. Application Data

(63) Continuation-in-part of application No. 17/553,614, filed on Dec. 16, 2021, now Pat. No. 12,199,980,
(Continued)

(51) Int. Cl.
*H04L 9/40*    (2022.01)
*G06F 21/45*    (2013.01)

(52) U.S. Cl.
CPC .......... *H04L 63/0876* (2013.01); *G06F 21/45* (2013.01)

(58) Field of Classification Search
CPC ............................. H04L 63/0876; G06F 21/45
(Continued)

(56) References Cited

U.S. PATENT DOCUMENTS

| 5,903,882 A | 5/1999 | Asay |
|---|---|---|
| 7,340,042 B2 | 3/2008 | Cluff |

(Continued)

FOREIGN PATENT DOCUMENTS

| WO | 2004028078 A1 | 4/2004 |
|---|---|---|
| WO | 2012127103 A1 | 9/2012 |
| WO | 2016001867 A2 | 1/2016 |

OTHER PUBLICATIONS

Shehu et al., 2019 IEE, "Privacy Preservation and Mandate Representation in Identity Management Systems", pp. 1-6 (Year: 2019).*

(Continued)

*Primary Examiner* — Khalil Naghdali
(74) *Attorney, Agent, or Firm* — Lowenstein Sandler LLP

(57) ABSTRACT

The subject matter of this specification can be implemented in, among other things, methods, systems, and computer-readable storage media. A method can include a first server receiving, from a first computing device, first data indicating a consumer service request, a consumer service entity identification (ID), and an authorization token each associated with a first user. The method further includes the first server sending to the second server an identity validation request identifying the first user, wherein the identity validation request comprises the consumer service entity ID and the authorization token. The method further includes the first server receiving from the second server a response to the identity validation request. The method further includes the first server causing an action to be performed corresponding to the consumer service request.

20 Claims, 24 Drawing Sheets

Related U.S. Application Data which is a continuation of application No. 17/213,107, filed on Mar. 25, 2021, now Pat. No. 11,228,592.

(60) Provisional application No. 63/016,173, filed on Apr. 27, 2020.

(58) Field of Classification Search
USPC .......................................................... 726/4
See application file for complete search history.

(56) References Cited

U.S. PATENT DOCUMENTS

| | | | |
|---|---|---|---|
| 8,474,028 | B2 | 6/2013 | Kulkarni |
| 8,640,214 | B2 | 1/2014 | Denis |
| 8,966,268 | B2 | 2/2015 | Marien |
| 9,081,978 | B1 | 7/2015 | Connolly |
| 9,124,433 | B2 | 9/2015 | Marien |
| 9,258,296 | B2 | 2/2016 | Juthani |
| 9,768,963 | B2 | 9/2017 | Chu |
| 9,847,989 | B2 | 12/2017 | Hakimian |
| 10,419,416 | B2 | 9/2019 | Wu |
| 10,535,064 | B2 | 1/2020 | Gordon |
| 11,057,375 | B1 * | 7/2021 | Conley .............. H04L 63/0876 |
| 11,983,723 | B2 * | 5/2024 | Mercury .............. G06V 40/174 |
| 2011/0119744 | A1 | 5/2011 | Cho |
| 2014/0133656 | A1 | 5/2014 | Wurster |
| 2015/0058931 | A1 | 2/2015 | Miu |
| 2015/0059003 | A1 | 2/2015 | Bouse |
| 2016/0048512 | A1 | 2/2016 | Cook |
| 2017/0012949 | A1 | 1/2017 | Boren |
| 2017/0374070 | A1 | 12/2017 | Shah |
| 2018/0101614 | A1 | 4/2018 | Kuipers |
| 2018/0159833 | A1 | 6/2018 | Zhang |
| 2018/0246968 | A1 * | 8/2018 | Barker .............. G06Q 10/0631 |
| 2018/0375849 | A1 * | 12/2018 | Koskimies ............ H04L 9/3234 |
| 2018/0376378 | A1 | 12/2018 | Greene |
| 2020/0045140 | A1 | 2/2020 | Khemani |
| 2020/0244659 | A1 | 7/2020 | Kunda |
| 2021/0092604 | A1 | 3/2021 | Fox |
| 2022/0191202 | A1 | 6/2022 | Peterson et al. |
| 2022/0417242 | A1 | 12/2022 | Peterson et al. |

OTHER PUBLICATIONS

Deng et al., 2020 IEEE Transactions on Information Forensics and Security, vol. 15, "Identity-Based Encryption Transformation for Flexible Sharing of Encrypted Data in Public Cloud", pp. 3168-3180 (Year: 2020).*

* cited by examiner

600

| User Identifier (9 bytes-numeric) |
| Generated Token (9 bytes-alphanumeric) |

| Vendor Name (36 bytes-alphanumeric) ||
|---|---|
| Vendor EIN (9 bytes-numeric) | Blank (9 bytes) |
| Time Stamp (12 bytes-date/time) | Valid time (9 bytes-numeric) |
| User Identifier (9 bytes-numeric) | Generated Token (9 bytes-alphanumeric) |

FIG. 7

CONSENT-BASED AUTHORIZATION SYSTEM FOR TAXATION AND CONSUMER SERVICES

PRIORITY

This application is a continuation-in-part of U.S. patent application Ser. No. 17/553,614 filed Dec. 16, 2021, which is a continuation of U.S. patent application Ser. No. 17/213,107 filed Mar. 25, 2021, and claims the benefit of U.S. Provisional Application No. 63/016,173, filed on Apr. 27, 2020, the entire contents of which are incorporated by reference herein in their entirety.

TECHNICAL FIELD

This disclosure relates to technologies of securing sensitive data for preventing identity theft and fraudulent use of an individual's sensitive data such as a social security number.

BACKGROUND

The unauthorized use of a stolen identity and social security number is a growing problem and in no way a victimless crime. There are some common themes that all victims of identity theft share. Once an individual's identity has been stolen they may never get it back. Identity thieves can share, sell, and reuse stolen social security numbers over and over. Statistically speaking, once an individual becomes a victim of identity theft they can almost guarantee that it will happen again. This can have profound effects on its victims both emotionally and financially and requires the victim to be responsible for the monitoring, tracking, and restoration of credit. While there are businesses that provide these types of services, they do little to prevent the problem. There are multiple ways that an individual's social security number can be exposed or compromised. For example, a social security number is a static number that can be used by the individuals themselves, business owners, and agencies. Any individual with a social security number is at risk for identity theft, and furthermore, the more times the social security number is provided or made available to conduct business (e.g., sales, transactions, loans, and the like), the more exposed the social security number becomes, thus leading to increased opportunity for identity thieves.

For example, an individual needs to provide certain information during a financial transaction. Legitimate third parties (e.g., providers), such as government entities, legitimate businesses (e.g., providing consumer services), and the like, have some measures in place to validate the information, while still being able to provide services to the subscriber. However, in some cases, the measures put in place by the providers may not be sufficient to protect the subscriber's identity and social security number from malicious third parties. Thus, there is a need to addresses such issues.

BRIEF DESCRIPTION OF THE DRAWINGS

FIG. 6 is a data structure of a subscriber's ID and a generated token (e.g., an identifier token), according to one embodiment.

FIG. 7 is a data structure of an authorization table according to one embodiment.

DETAILED DESCRIPTION

Figure 1:
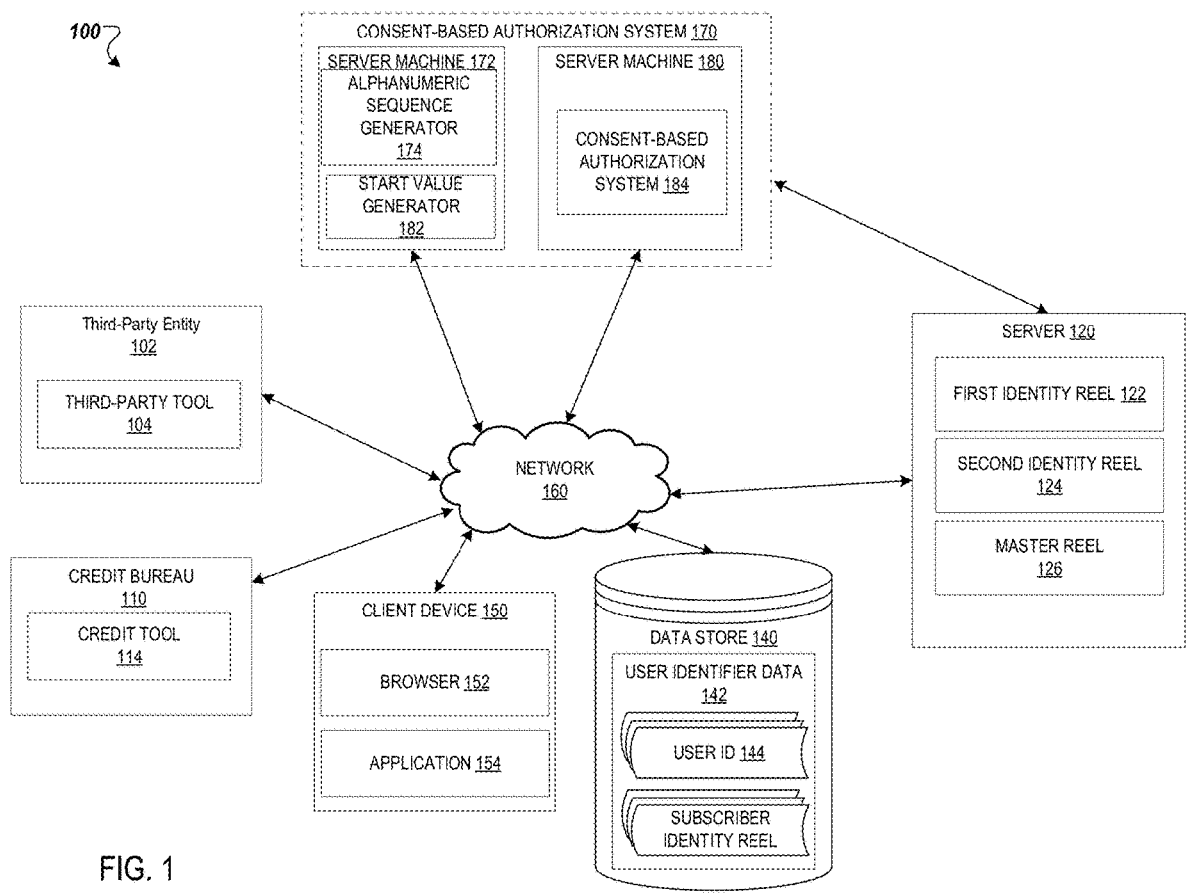
FIG. 1 is a block diagram illustrating an exemplary system architecture in which embodiments of the disclosure may operate.

The following description sets forth numerous specific details such as examples of specific systems, components, methods, and so forth, in order to provide a good understanding of various embodiments of an identification validation system to assist in securing sensitive identification data to, for example, prevent theft and/or fraudulent use of a person's identity or identification, such as their social security number (SSN) or other sensitive identification information that may be required to verify an individual identity and/or a person's status (e.g., credit score) by a third party (e.g., a taxing authority and/or tax preparation entity), such as a vendor, a business (e.g., a consumer service), a government entity, or the like (e.g., such as to perform an electronic transaction). In conventional transaction practices, such as when an individual needs to conduct a transaction requiring their SSN (or other sensitive identification information) (e.g., in a financial transaction, securing a loan, etc.), the individual provides their SSN either by writing it on a paper application (e.g., a tax return, credit worthiness application, invoice/transaction), typing it into a website (e.g., adding to a user profile, digital application such as for processing a credit check or a tax-related request) and/or verbally providing it. Each of these methods may not be secure and can lead to a loss or a compromise of the individual's SSN, and thus to identity theft or fraudulent use of the SSN.

Aspects of the present disclosure describe a consent-based authorization system to address the above-mentioned and other issues. Technologies of the consent-based authorization system provide the user with a one-time use transient identifier token that the user can provide as a digital extension to their SSN during a transaction (e.g., credit check, consumer service, tax-related processes, and the like). The identifier token is randomly generated for each transaction, and must be validated in order for the transaction to be authorized. Because the identifier token is randomly generated, can be used only once, and is only valid for a defined duration of time, this minimizes the risk that an identity thief could use the user's SSN in a transaction without the user's consent.

The identity validation system can provide a secure way for an individual to engage in a transaction with a third-party entity. For example, many transactions between individuals and third-party entities require the individual to provide sensitive information such as their social security number (SSN), credit card number, personal identification number (PIN) number, or the like to the third-party entity. The identity validation system can allow an individual engaging in such a transaction to provide their sensitive information in a secure manner without introducing significant disruptions to currently existing transaction processes. For example, current transaction processes between an individual and a third-part entity often require the individual to provide their SSN, perhaps in a written, typed, or verbal manner. The identity validation system can allow the individual to provide their sensitive information (e.g., a static alphanumeric sequence, such as an SSN) by concatenating a secure extension that helps protect the sensitive information from being stolen and used by a malicious third party. The identity validation system can generate a secure extension which is an alphanumeric sequence. The individual can use the secure extension as an additional layer of security to protect their sensitive information. Although the consent-based authorization system is primarily presented herein as a system to protect an individual's SSN during a transaction with a specific entity, this does not limit the scope in which the consent-based authorization system can be applicable. In some embodiments, the individual may need to protect other sensitive information, such as an identification number or other identification information (including any static identifier containing letters, numbers, and symbols) that would need to be made available to the third-party entity, and not to a malicious third party.

The identity validation system described herein provides a secure extension, which can be an on-demand and/or randomly generated alphanumeric sequence that can be concatenated to an individual's sensitive information (e.g., SSN). For example, the secure extension can be an alphanumeric sequence generated by the consent-based authorization system. The secure extension can be additional security data to protect the individual's sensitive information. The identity validation system can use a multi-control measure that allows the individual to decide on various parameters, such as which third-party entity is allowed to access the sensitive information, a time duration for which the secure extension is valid, specific actions an entity is authorized to take with the sensitive information, and the like. For example, an individual that subscribes to the consent-based authorization system (e.g., a subscriber) is assigned an identification number, and then is allowed to define such parameters (e.g., a business name, an employer identification number (EIN), a time period of validity, a number of times the secure extension can be used, an action identification (ID) associated with a specific action to be performed by an authorized entity, etc.) prior to requesting the secure extension for their sensitive information. In some embodiments, the consent-based authorization system may be available only to those individuals, families, and/or business groups that have a valid subscription to the consent-based authorization system, however in other embodiments, the consent-based authorization system may be available to any individual or entity universally. For example, the consent-based authorization system may use the assigned identification number to verify that an individual is subscribed to use and access the consent-based authorization system.

Additional security benefits can be provided over the conventional transaction practices. For example, the individual can set a duration of time and/or the identification validation system can include a pre-determined time, during which an inquiry window for inquiring regarding the sensitive identification information will be open. The validation platform described herein can be used in connection with existing transaction systems and platforms, such as used by lending institutions, social security administration, car dealerships, cable companies, phone services, as well as other businesses or organizations that use sensitive information, such as creditworthiness and so on. Further, third-party entities, such as vendors, businesses, credit bureaus, government entities, etc. can also use the described identity validation system to either protect their own sensitive information or the sensitive information of their clients (e.g., the "individuals").

The consent-based authorization system described herein can allow a first entity to protect their sensitive information during a transaction with a second party. The first party or the second party can be individuals, businesses (e.g., consumer services such as a tax return preparation agency), government entities (e.g., credit bureaus and taxing authorities), or any parties associated with the transaction. The individual can subscribe to the consent-based authorization system (an individual subscribing to the consent-based authorization system can be referred to as a "subscriber") which can include a consent-based authorization service. For example, a subscriber wanting to make a transaction with a specific entity can be required to provide some sensitive information. In one embodiment, the sensitive information is a static number, such as a social security number. The subscriber then has to authorize the specific entity to use their sensitive information to inquire additional information, such as a credit report, a credit score, a tax information (e.g., tax return confirmation number), consumer service information (e.g., user profile data), and/or the like of the subscriber. For example, the specific entity will not be authorized to obtain a credit report or a credit score if the subscriber has not provided authorization to use their sensitive information to inquire for the additional information. In another example, a specific entity will not be authorized to process a tax return if the subscriber has not provided authorization to use their sensitive information associated with tax-related requests. In another example a consumer service entity may not be authorized to provide further service to a user request (e.g., accessing a user account, entering and/or updating sensitive data associated with a user account, performing a transaction, etc.) In order for the subscriber to provide authorization to the specific entity, the subscriber can provide information regarding the entity to the consent-based authorization system and subsequently request an identifier token from the consent-based authorization system. The identifier token can include a random alphanumeric sequence provided by the consent-based authorization system. The subscriber can then provide to the specific entity their sensitive information along with the identifier token as an alphanumeric extension to the sensitive information. In some embodiments, the identifier token can include the sensitive information as well as the random alphanumeric sequence, in which case the subscriber provides the just the identifier token to the specific entity. This can allow the specific entity to validate the subscriber's identity and inquire regarding the additional information needed to make the transaction. The identity validation system provides a unique pathway for a subscriber to extend any static identifier (such as a social security number) containing letters, numbers, and symbols, with a random alphanumeric sequence.

It will be apparent to one skilled in the art, however, that at least some embodiments may be practiced without these specific details. In other instances, well-known components, elements, or methods are not described in detail or are presented in a simple block diagram format in order to avoid unnecessarily obscuring the subject matter described herein. Thus, the specific details set forth hereinafter are merely exemplary. Particular implementations may vary from these exemplary details and still be contemplated to be within the spirit and scope of the present embodiments.

In an example embodiment, a method may include a first server receiving from a first computing device first data indicating a tax-related request and an authorization token each associated with a first user. The method may further includes a first server sending to a second server an identity validation request identifying the first user and the tax-related request. The identity validation request comprises the authorization token. The method may further include the first server receiving from the second server a response to the identity validation request. The method may further include the first server sending to the first computing device second data corresponding to the response to the identity validation request.

In an example embodiment, a method may include receiving, by a server from a first computing device associated with a first user ID, a first request to retrieve a first authorization token. The first request indicates a taxing authority identification (ID) associated with the first authorization token. The method further includes the server generating the first authorization token. The method further includes the server sending to the first computing device the first authorization token. The method further includes receiving by the server from the second server an identity validation request comprising a second user ID, a second authorization token, and an agency ID responsive to sending the first authorization token to the first computing device receiving. The method further includes the server validating the identity validation request based on a first comparison between the first user ID and the second user ID, a second comparison between the first authorization token and the second authorization token, and a third comparison between the taxing authority ID and the agency ID.

In an example embodiment, a method may include a first server receiving from a first computing device first data indicating a consumer service request, a consumer service entity identification (ID), and an authorization token each associated with a first user. The method further includes the first server sending to the second server an identity validation request identifying the first user. The identity validation request comprises the consumer service entity ID and the authorization token. The method further includes the first server receiving from the second server a response to the identity validation request. The method further includes the first server causing an action to be performed responsive to receipt of the response to the identity validation request, wherein the action corresponds to the consumer service request.

In some embodiments, a system includes a processing unit and memory structure configured to process and/or store instructions and that facilities carry out the above methods. In some embodiments, a non-transitory computer-readable storage medium may be used to store instructions that when executed cause performance of the above described methods.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

FIG. 1 is a block diagram illustrating an exemplary system architecture 100 in which embodiments of the disclosure may operate. As shown in FIG. 1, system architecture 100 includes a third-party entity 102, a credit bureau 110, a client device 150, a data store 140, and a server 120, which can include an identity reel system 170. In other words, identity validation system 170 may be part of the server 120. In some embodiments, one or more components of the consent-based authorization system 170 may be fully or partially integrated into client device 150. The third-party entity 102, the client device 150, the data store 140, the server 120, the credit bureau 110, and the consent-based authorization system 170 can each be hosted by one or more computing devices including server computers, desktop computers, laptop computers, tablet computers, notebook computers, personal digital assistants (PDAs), mobile communication devices, cell phones, hand-held computers, or similar computing devices.

The third-party entity 102, client device 150, data store 140, server 120, and identity validation system 170 may be coupled to each other via a network 160 (e.g., for performing methodology described herein). In some embodiments, network 160 is a private network that provides each element of system architecture 100 with access to each other and other privately available computing devices. Network 160 may include one or more wide area networks (WANs), local area networks (LANs), wired network (e.g., Ethernet network), wireless networks (e.g., an 802.11 network or a Wi-Fi network), cellular network (e.g., a Long Term Evolution (LTE) network), routers, hubs, switches, server computers, and/or any combination thereof. Alternatively or additionally, any of the elements of the system architecture 100 can be integrated together or otherwise coupled without the use of network 160.

The client device 150 may be or include at least any personal computers (PCs), laptops, mobile phones, tablet computers, netbook computers, etc. The client device 150 may include a browser 152, an application 154, and/or other tools as described and performed by other systems of the system architecture 100. In some embodiments, the client device 150 may be capable of accessing the data store 140, server 120, and/or identity validation system 170 and communicating (e.g., transmitting and/or receiving) identity validation requests, and/or inputs and outputs of various process tools (e.g., alphanumeric sequence generator 174, start value generator 182, validation system 184, and/or first identity reel 122, second identity reel 124, and master reel 126) at various stages processing of the system architecture 100, as described herein.

As shown in FIG. 1, third-party entity 102 includes third-party tool 104 that can send an alphanumeric sequence generated by alphanumeric sequence generator 174 to the server 120, which can include the validation system 184. The third-party tool 104 can include various devices that can communicate information such as one or more alphanumeric sequences between the server 120, the identity reel system 170, the credit bureau 110, and the client device 150.

The client device 150 can include a browser 152 and an application 154. The application 154 can be a mobile application designed to be executed by a client device 150 via application 154, and can allow the client device 150 to access or communicate with one or more of the third-party entity 102, the credit bureau 110, the server 120, the consent-based authorization system 170, and the data store 140.

The server 120 can store one or more identity reels 122 and 124 that can generate a random alphanumeric sequence, using server machine 172 which can include alphanumeric sequence generator 174 and start value generator 182. Identity reels 122 and 124 can be randomized based on a starting seed value generated by master identity reel 126, as described below. For example, the server 120 may include identity validation system 170 which includes a start value generator 182 which generates a start value based on the master reel 126. Further, the consent-based authorization system 170 may include an alphanumeric sequence generator 174 to generate the random alphanumeric sequence based on an identity reel, such as the first identity reel 122 or the second identity reel 124.

The random alphanumeric sequence can be generated and transmitted to the client device 150, via the application 154 and/or the browser 152. The client device 150 can provide the random alphanumeric sequence to third-party entity 102 and/or credit bureau 110. If the random alphanumeric sequence is provided to third-party entity 102 then the random alphanumeric sequence can be processed, and handled by third-party tool 104. Similarly, if the random alphanumeric sequence is provided to credit bureau 110, it can be processed and handled by credit tool 114.

The random alphanumeric sequence or a different alphanumeric sequence can be provided back to identity validation system 170, which may be a part of server 120. Sever 120 may include a sever machine 180 which further includes validation system 184. Validation system 184 may check that the random alphanumeric sequence received by either third party entity 102 or credit bureau 110 is representative of the random alphanumeric sequence generated by the identity reels 122 or 124.

In some embodiments, data (such as the random alphanumeric sequence, the user identifier information, sensitive information associated with the user, and the like) may be stored on data store 140. Data store 140 may be a memory (e.g., random access memory), a drive (e.g., a hard drive, a flash drive), a database system, or another type of component or device capable of storing data on a remote server.

Server 120 may include one or more computing devices such as a rackmount server, a router computer, a server computer, a personal computer, a mainframe computer, a laptop computer, a tablet computer, a desktop computer, etc. The server 120 can include at least a first identity reel 122, a second identity reel 124, and a master reel 126.

In embodiments, a "user" may be represented as a single individual. However, other embodiments of the disclosure encompass a "user" being an entity controlled by multiple users and/or an automated source. For example, a user can be referred to as a group of administrators who may be considered a "user."

The identity validation system 170 can exist on an external server, such as server 120, and can include a core data structure, such as master reel 126, with a set of alphanumeric characters that are continuously randomized by the consent-based authorization system 170. The core data structure can be considered to be made up of a set of individual smaller data structures, referred to as individual reels (for example, first identity reel 122 and second identity reel 124), each of which includes its own set of alphanumeric characters that are continuously randomized. The alphanumeric characters of the smaller data structures can be visualized as a set of columns and rows, or alternatively columns and lines, as is figuratively illustrated in FIG. 3. At some point in time, the randomization of the alphanumeric characters can be temporarily stopped, and an alphanumeric sequence can be determined, wherein the columns can define an order of each alphanumeric character, and a given row can define specific alphanumeric characters of the sequence. This randomly defined alphanumeric sequence is representative of the identifier token.

Since the columns and rows of the individual reels, such as first identity reel 122 and second identity reel 124, have to be continuously randomized, the randomization can be done by providing an initial random seed value, which is generated by master reel 126. A counter can be started to cycle through the alphanumeric characters of the rows. While the counter is cycling through the random alphanumeric characters, the individual reel is considered to be in a "free-fall" state. When a subscriber requests an identifier token via client device 150, the counter is stopped (e.g., the free-fall state is paused) and the alphanumeric sequence, at that point in time, is provided to the subscriber as the identifier token, and the counter resumes (e.g., the individual reel returns to the free-fall state). The random seed value to start the counter for the individual reel is provided by the master reel. Similar to an individual reel, the master reel can be in a free-fall state, which can be paused when an initial random seed value is requested for an individual reel. This can occur, for example, when a new individual subscribes to the consent-based authorization system, and a new individual reel is to be generated for the new individual.

Each subscriber to the consent-based authorization system is assigned a unique individual reel, which can then be referred to as a subscriber reel, which is generated at the server. At the time that each subscriber reel is generated, the master reel on the server pauses from its free-fall state and provides a random seed value to be used at the initial random seed value for the corresponding subscriber reel. This allows the subscriber reel, which is an individual reel assigned to a subscriber, to start its free-fall state, wherein the alphanumeric characters of the columns and lines are continuously randomized (until the subscriber requests an identifier token).

A hypothetical situation is presented below to demonstrate how a subscriber the consent-based authorization system can conduct a transaction with a third-party entity. The subscriber can access identity validation system 170 from client device 150, via browser 152 and/or application 154. Identity validation system 170 can be stored on server 120. Consider a subscriber, Mark, who has been a victim of identity theft, but is also a subscriber to the consent-based authorization system 170. Mark, subsequently discovering that he is or has been a victim of identity theft, decides to protect his social security number from being used without his consent. At some point in time, Mark (the subscriber) decides to buy a new car (e.g., initiate a transaction) from a dealership (the provider). The dealership is a third-party entity, such as third-party entity 102, which can have third-party tool 104 allowing third-party entity 102 to send and receive information with at least one of client device 150, credit bureau 110, and server 102, which may include identity validation system 170. The dealership requests that Mark provide some personal information prior to providing financing for the purchase, so in order to purchase the car from the dealership, Mark is required to provide at least one piece of identification information.

Mark (e.g., a subscriber) uses a client device 150 and can authorize the dealership (e.g., the provider), such as third-party entity 102 to inquire into his credit by using a mobile application 154 or computer that can access the consent-based authorization system 170 on a remote server 120. Mark can then log into an application 154, for example on a user device, such as client device 150 of the consent-based authorization system, and add the dealership to an "Inquiring Vendor Field" by using an Employer's Identification Number (EIN) of a third-party entity 102, such as the dealership. The EIN is a unique identification number provided to individual businesses for taxation purposes, and a subscriber can provide the EIN to the consent-based authorization system which can validate the business prior to allowing the subscriber to authorize a transaction with the business. The subscriber, Mark, can then select a timestamp, via application 154, to set a duration of time that he wishes to keep an inquiry window open for the vendor (dealership) to use (e.g., a duration of time that his identifier token will be valid). Then, Mark can request an identifier token from the server 120 hosting the consent-based authorization system 170. The identity validation system at the remote server includes a master reel and a subscriber reel (an individual reel associated with Mark).

Mark's subscriber reel (e.g., first identity reel 122) has been generated at the time that Mark subscribed to the consent-based authorization system 170 and a random seed value generated by the master reel (e.g., master reel 126) was provided to seed and initialize the randomization (columns and lines) of the alphanumeric characters at the time that Mark's subscriber reel was generated. Prior to Mark requesting an identifier token, Mark's subscriber reel continuously and randomly counts through alphanumeric sequences (e.g., is in a free-fall state). At the time that Mark requests an identifier token, Mark's subscriber reel stops its free-fall state (e.g., its continuous and random generation of alphanumeric sequences). The identity validation system reads the current alphanumeric sequence, and sends it to Mark via Mark's mobile application 154 or computer a random alphanumeric sequence, and then causes Mark's subscriber reel to re-enter its free-fall state.

Through his mobile application or computer, Mark receives his requested identifier token from the server 120, and Mark is then able to provide his identification information, including the identifier token, to the dealership (and/or to a finance or loan department of the dealership). Thus Mark provides his identification information and uses his random alphanumeric sequence as an extension to his information. As an additional added layer of security, Mark had set a duration of time that his identifier token is valid. Further, it is worth noting that the identifier token becomes invalid after the duration of time set by Mark has passed, or once the identifier token has been used by Mark, whichever occurs sooner.

The dealership may have a similar application that can be operated on a mobile device, a computer, or the like to access the consent-based authorization system. The dealership may send a request to a reporting agency, such as a credit bureau to access Mark's credit information. The credit bureau can send Mark's information, including the identifier token to the consent-based authorization system at the remote server to validate the request and confirm that Mark has authorized the request of the dealership.

In one embodiment, Mark or the dealership can provide his identifier token, including a random alphanumeric sequence such as generated by alphanumeric sequence generator 174, and his social security number from the consent-based authorization system 170. The identifier token can be provided as an extension of his social security number, to a reporting agency, such as a credit bureau. The reporting agency subsequently must check with the consent-based authorization system on the remote server 120 by sending the subscriber ID, the identifier, and the EIN to the consent-based authorization system 170. If the consent-based authorization system 170 determines that the request from the reporting agency originated from and was authorized by the subscriber, it provides the requested information (credit information) to the credit bureau 110, which can then send the subscriber's credit information to the dealership, which in turn allows the dealership to validate his identity and receive his credit report. A reporting agency is any institution that provides financial information directly to an individual or a third party by associating an individual's social security number for the purpose of, to establish, validate, or inquire into a user's creditworthiness in a financial transaction.

In some embodiments, server 120 receives from a first device, such as client device 150 (for example a user device associated with Mark), a first request to retrieve an identifier token associated with a user account (such as Mark's user account). Server 120 can generate a first alphanumeric sequence associated with the user account, and perform a randomization procedure on the first alphanumeric sequence to generate a second alphanumeric sequence associated with the user account. Server 120 can generate the identifier token which includes the second alphanumeric sequence. Server 120 can send the identifier token to the first device (e.g., client device 150), which can allow a subscriber (Mark) associated with the user account to provide or supply the identifier token to a second device. For example, the second device can be a device associated with a third-party entity, such as a car dealership. Server 120 can receive a second request that is associated with performing an action, such as a data exchange, using sensitive data (such as Mark's social security number) associated with the user account from a third device. Server 120 can send first data which includes the second request to the third data. If the second request is validated, server 120 can authorize a transaction related to the second request. If the second request cannot be validated, server 120 can send a notification that the second request is potentially fraudulent.

Figure 2:
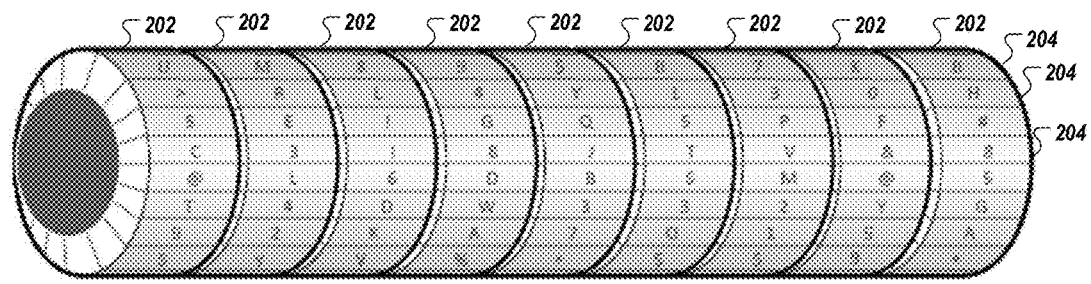
FIG. 2 is a conceptual illustration of a data structure that is used by a consent-based authorization system according to some embodiments.

FIG. 2 is a conceptual illustration of a data structure 200 that is used by a consent-based authorization system according to some embodiments. The data structure 200 can be referred to as a "reel" or an "individual reel" and can be used to generate an identifier token for a subscriber of the consent-based authorization system. For example, the data structure 200 can be data store or a series of registers. As depicted in FIG. 2, the reel includes nine columns 202, each with a number of lines 204 (e.g., rows) of alphanumeric characters. Although the reel is depicted with nine columns, in other embodiments, there is no limit to a specific number of lines or columns, either of which can be increased or decreased depending on the requirements of intended applications. As such, for exemplary purposes in the following description, the data structure 200 (e.g., reel) will be depicted as having nine columns 202 and forty-six lines 204. Each of the columns 202 and lines 204 include one or more alphanumeric characters which are continuously randomized in order to generate a random alphanumeric sequence that can be continually randomized. For example, the random alphanumeric sequence can be a combination of some of the alphanumeric characters stored in the reel. The process of continuous randomization of the alphanumeric characters of the columns and lines can be referred to as "free-fall," and similarly while an individual reel is in a state of continuously randomizing the alphanumeric characters, the individual reel can be said to be in a "free-fall state."

A number of individual reels can be employed or networked together to create a composite reel, also called a "master reel." In other words, a master reel can be made of up a number of the data structures 200. Since the master reel can be made up of a number of individual reels, the master can have more columns and or more lines than the individual reels. The master reel operates in a similar manner as the individual reels. Each of the columns and lines of the master reel includes one or more alphanumeric characters which are continuously randomized in order to generate a random alphanumeric sequence that can be continually randomized. The random alphanumeric sequence generated by the master reel be the same length (e.g., number of alphanumeric characters) or a different length than the random alphanumeric sequence generated by an individual reel. The process of continuous randomization of the alphanumeric characters of the columns and lines can be referred to as "free-fall," and similarly while the master reel is in a state of continuously randomizing the alphanumeric characters, the master reel can be said to be in a "free-fall state." Each individual reel, including individual reels that make up the master reel, can be identified with a free-fall ID (FFID), which is a unique identifier for reel.

At least one role of the master reel is to generate a random alphanumeric sequence that is used as a start value to seed the randomization of the columns and lines of the individual reel. This allows for each individual reel to begin its randomization with a random seed. An individual reel can be assigned a start value and begin randomizing the alphanumeric characters of its columns and lines at the time at which is created. Since each individual reel is seeded with a random start value generated by the master reel, each identity reel is unique.

When a subscriber of the consent-based authorization system starts their subscription, a unique individual reel is generated that is associated with the subscriber, and thus can be referred to as a subscriber reel. The subscriber reel is an individual reel, except that it is associated with a subscriber. The subscriber can begin their subscription to the consent-based authorization system, for example by downloading an application on their mobile device or user device, by paying a subscription fee, or by whatever requirements are put in place by the consent-based authorization system. Once the subscriber has begun their subscription, the consent-based authorization system generates a user ID (also referred to as a reel user identification (reel user ID (UID)) that is associated with the subscriber. The user ID includes information to initial set up with subscribe with the consent-based authorization system and can be used to store, verify, and communicate with the subscriber. The subscriber can make authorization requests to a remote server of the consent-based authorization system using their user device. For example, an authorization request can include a request for a random alphanumeric sequence generated by the subscriber's subscriber reel at the time of the request. At the time of the request, the consent-based authorization system generates an identifier token from the subscriber reel and can send it to the subscriber. A data processing center for processing and networking of the consent-based authorization system is located on the remote server of the consent-based authorization system, and can be referred to as a reel hub. The ways that at least the user ID and the identifier token are used between the subscriber and the consent-based authorization system can vary depending on specific applications, intermediate parties (such as a requesting organization, a third-party agency, a credit bureau, a vendor, etc.), a fraudulent individual, or the like, as will be described with respect to FIGS. 15A-15D.

Figure 3:
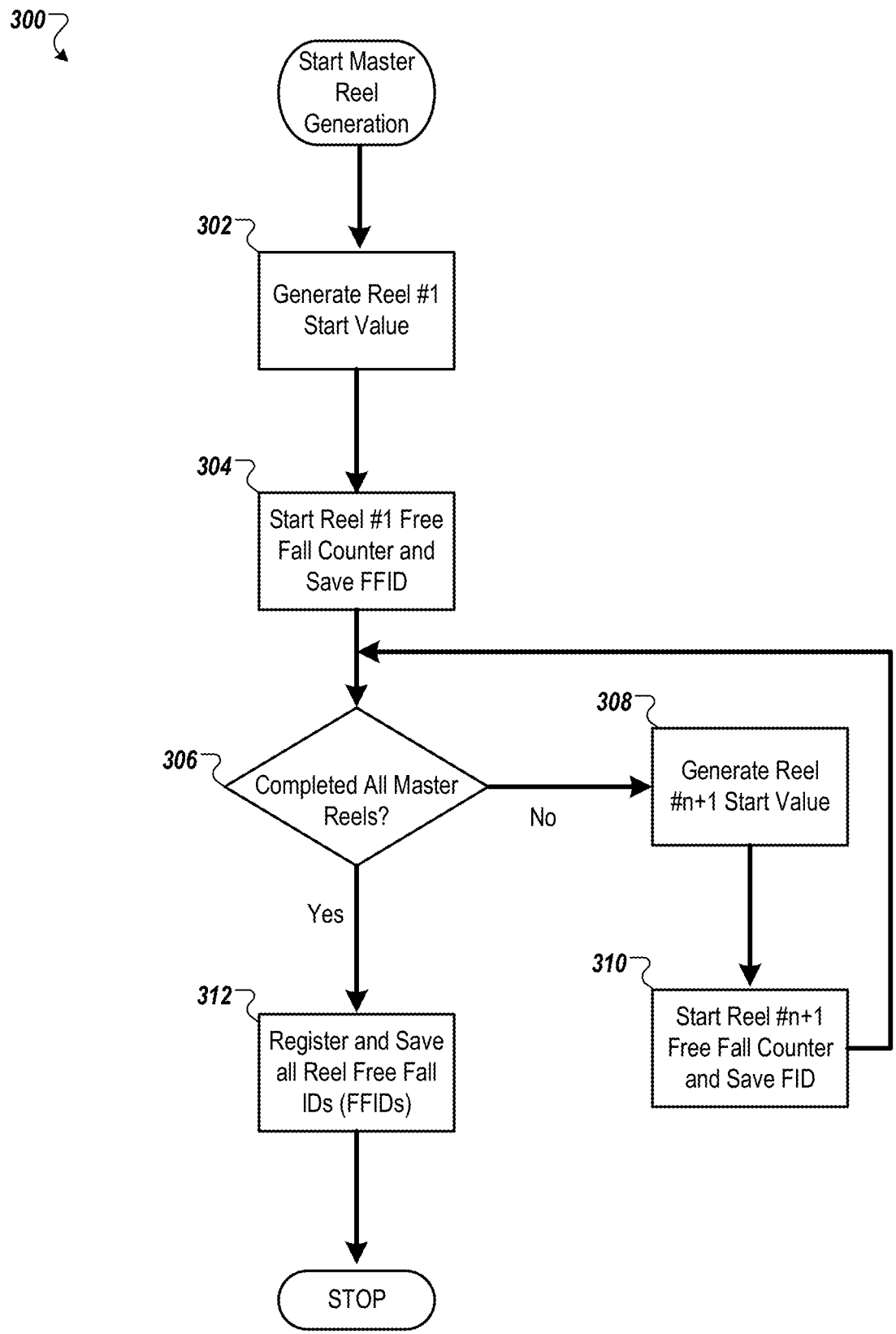
FIG. 3 is a flow diagram of a method of networking independent reels together to form a master reel according to one embodiment.

FIG. 3 is a flow diagram of a method 300 of networking independent reels together to form a master reel according to one embodiment. Method 300 can be performed by processing logic comprising hardware, firmware, or any combination thereof. Method 300 can be performed by processing logic of the data structure 200 of the consent-based authorization system of FIG. 2. Method 300 refers to a process of networking several independent reels to form a master reel, which generates randomized seed values for individual reels (e.g., a subscriber reel associated with a subscriber of the consent-based authorization system). In some embodiments, there may be more than one master reel generating the randomized seed values.

Referring back to FIG. 3, the method 300 begins by processing logic generating a start value for a first reel (reel #1) (block 302). The processing logic starts a free-fall counter for the first reel (reel #1) at the start value and saves a corresponding free-fall identification (FFID) (block 304). The processing logic checks if corresponding operations of block 302 and block 304 have been completed for all individual reels that are to be used to make up the master reel (block 306). If there are additional reels whose start values have not been generated, the processing logic generates a start value for an $(n+1)^{th}$ reel (block 308). The processing logic starts a free-fall counter at the start value for the $(n+1)^{th}$ reel and saves a corresponding FFID (block 310). For example, the processing logic may need to generate N individual reels (as needed to form the master reel), and will repeat the operations of block 308 and block 310 until N individual reels are generated (e.g., n+1=N) and networked to form the master reel. The processing logic determines that all individual reels of the master reel are completed (e.g., have been assigned a start value and are in a free-fall state) (at block 306), and the processing logic registers and saves all reel FFIDs, and the method 300 ends.

Figure 4:
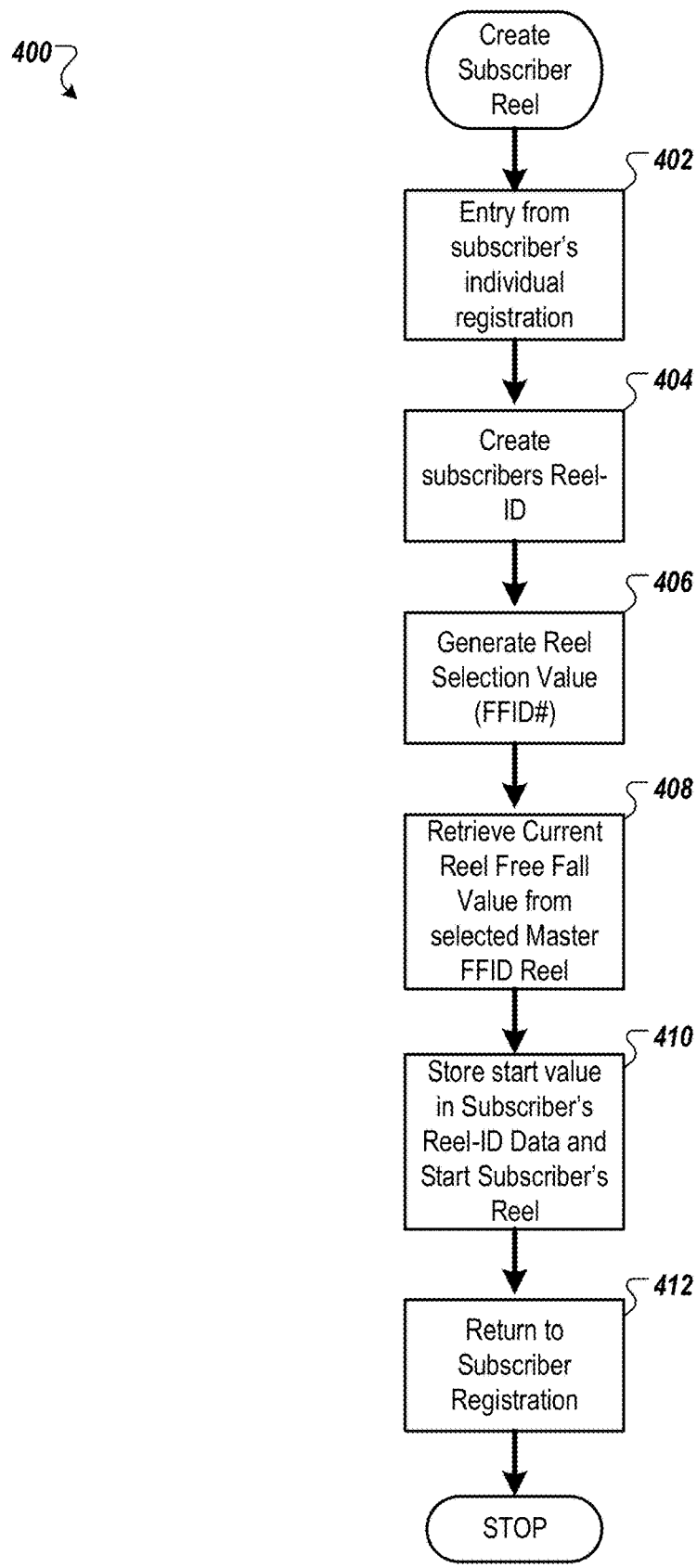
FIG. 4 is a flow diagram of a method of creating a subscriber reel according to one embodiment.

FIG. 4 is a flow diagram of a method 400 of creating a subscriber reel according to one embodiment. Method 400 can be performed by processing logic comprising hardware, firmware, or any combination thereof. Method 400 can be performed by processing logic of the data structure 200 of the consent-based authorization system of FIG. 2.

Referring back to FIG. 4, the method 400 to create a subscriber's identity reel begins by the processing logic receiving an entry from the subscriber's individual registration (block 402). The processing logic creates a user ID (e.g., a reel UID) for the subscriber (block 404). The processing logic generates a reel selection value (FFID #) (block 406). The processing logic retrieves a current reel free-fall value that is selected from the master FFID reel (block 408). The processing logic stores the start value in the user ID data and starts the subscriber's individual reel (e.g., the subscriber reel) (block 410). The processing logic returns to the subscriber registration (block 412) and the method 400 ends.

The start value for the subscriber reel is generated by the master reel, such as the master reel of FIG. 3. In order to generate a start value, the master reel can randomly select a value or an alphanumeric character from one of its lines and one of its columns. The value can be assigned to each column and line of the subscriber reel. Once the value has been assigned to each column and line of the subscriber reel, the master reel can return to its free-fall state. Similarly, once the value is assigned to each column and line of the subscriber reel, the subscriber reel can start its free-fall state. Because the value selected by the master reel is random and is used as a seed to start the randomization of the alphanumeric characters of the subscriber reel, each subscriber reel will be unique. It is worth noting that the subscriber reel remains in its free-fall state until the subscriber requests an identifier token from the consent-based authorization system.

Figure 5:
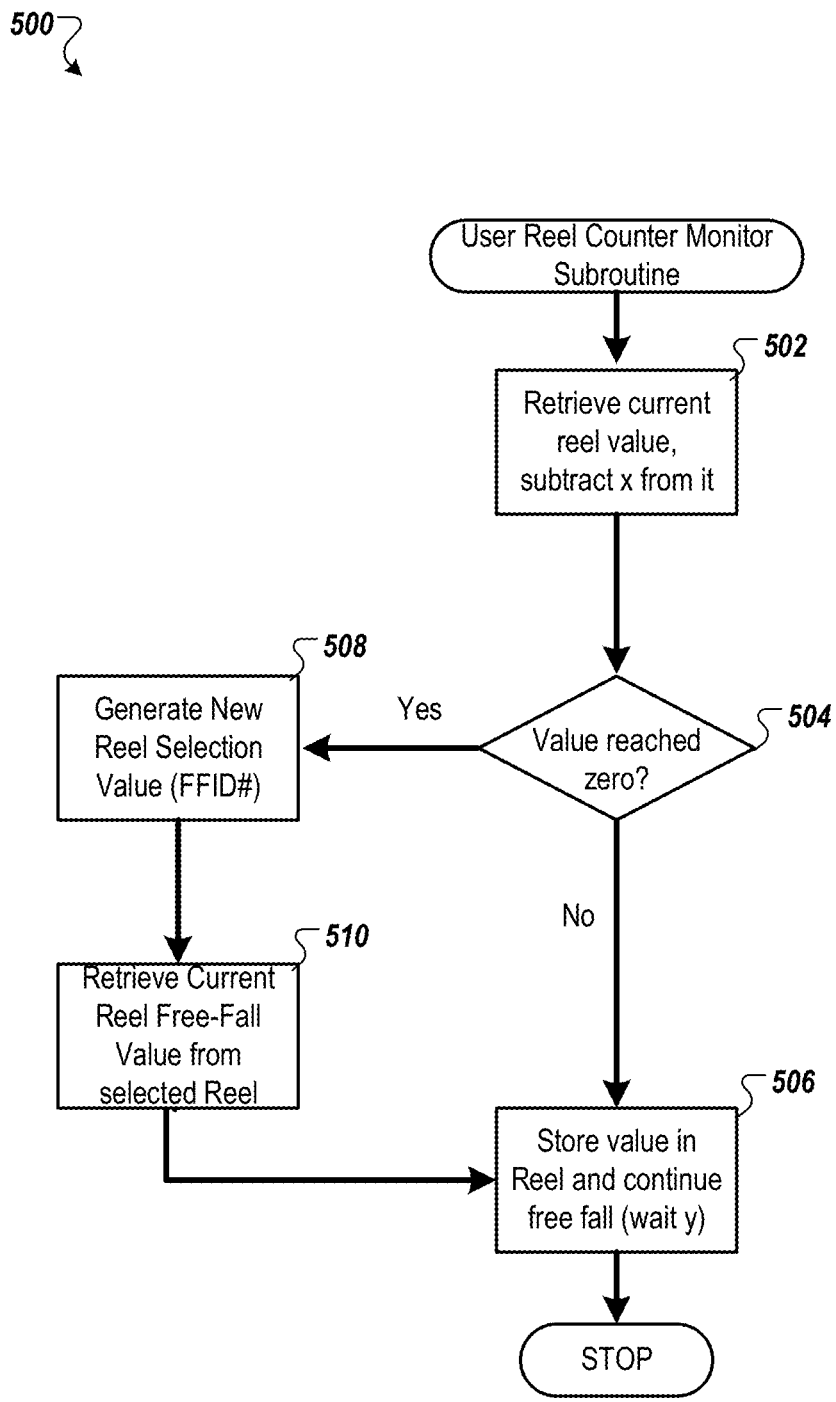
FIG. 5 is a flow diagram of a method of a subroutine to monitor a subscriber's identity reel counter according to one embodiment.

FIG. 5 is a flow diagram of a method 500 of a subroutine to monitor a subscriber's identity reel counter according to one embodiment. Method 500 can be performed by processing logic comprising hardware, firmware, or any combination thereof. Method 500 can be performed by processing logic of the data structure 200 of the consent-based authorization system of FIG. 2. For example, the method 500 may be executed when the subscriber's identity reel counter reaches zero. When the subscriber's identity reel counter reaches zero it needs to be re-seeded (e.g., with a random value from the master reel), and the counter needs to be reset to continue counting. Additionally or alternatively, the method 500 may be executed when a master reel counter reaches zero and needs to be reset and restarted.

Referring back to FIG. 5, the method 500 begins by the processing logic retrieving a current reel value, and subtracting a value (x) from the current reel value (block 502). The value x can be a hexadecimal value that is created at the time that a new master reel or a new subscriber reel is generated. The value x is associated with the corresponding identity reel, and can be different for each reel. The value x can be used to decrement the free-fall value of the corresponding reel until the reel counter reaches zero (e.g., each value counted by the reel is zero). The value x is unique to each corresponding reel, which allows randomization of the reel values (e.g., the random alphanumeric sequence) in such a way to avoid having predictable behavior and generation of the reel values across different reels. The processing logic checks if the current value has reached zero (block 504). If the current value has not reached zero, the processing logic stores the current value in the reel and continues the free-fall state and waits y (block 506), and the method 500 ends. If the current value has reached zero, the processing logic generates a new reel selection value (FFID #) (e.g., as described with respect to the method 400 of FIG. 4) (block 508). The processing logic retrieves a current reel free-fall value from the selected reel (block 510). The processing logic stores the current value in the reel and continues the free-fall state and waits for a time (y) (block 506) and the method 500 ends. In one embodiment, the time y is measured in milliseconds. In other embodiments, the time y can be measured in other appropriate units, such as microseconds, nanoseconds, blocks (pre-defined durations), etc. Similar to the value x, the time y can be randomly set for each corresponding reel at the time the reel is created, and can be different values for each reel.

FIG. 6 is a data structure of a subscriber's ID and a generated token 600 (e.g., an identifier token), according to one embodiment. For example, the subscriber's ID can be the subscriber's SSN, driver's license number, credit card number, or the like. The subscriber's generated token represents a one-time use random alphanumeric sequence generated by the subscriber reel (e.g., the individual reel associated with the subscriber). The identity validation system can return an identifier token, which is a one-time use random alphanumeric sequence generated by the subscriber reel and used as an extension to secure identifier information. The random alphanumeric sequence shown in FIG. 6 is a nine-digit alphanumeric sequence, but the number of characters in the alphanumeric sequence can be more or less depending on the application.

The subscriber reel is a data store or a series of registers (that can be conceptually visualized as columns and rows/lines) that stores alphanumeric characters. The identifier token is the random alphanumeric sequence that is generated by the subscriber reel of the consent-based authorization system. The identifier token is defined by a current value, e.g., a combination of the alphanumeric characters stored in the series of registers, of the subscriber reel at the time that the consent-based authorization system receives a request from the subscriber for the identifier token. The identifier token can then be added as an extension to the subscriber's social security number (or other identification number or information). For example, as depicted in FIG. 6, the subscriber's identification information is a nine-byte numeric field (such as an SSN) and the identifier token is a nine-byte alphanumeric field (such as generated by the subscriber reel).

The subscriber's identifier token can be used in combination with inputs of an authorization table to complete its use. The identity reel system can use the identifier token to validate a transaction between the subscriber user device and a legitimate third party, such as a vendor, agency, government entity, or the like using a device, such as a second user device or a computer to perform a transaction with the subscriber user device. The identifier token is an extension to a secure identifier (e.g., identification information). Its one-time use property ensures that the subscriber has control of their secure identification information. For example, in at least one embodiment, a random alphanumeric sequence can be used in conjunction with a subscriber's social security number (SSN) as an identifier token as follows:

User SSN+RID Token=XXX-XX-XXXX+9ZQ87JM3G
where the last 9 alphanumeric characters are generated by the subscriber reel.

FIG. 7 is a data structure of an authorization table 700 according to one embodiment. The authorization table 700 can be the same or similar to the authorization table described above, and at least with respect to FIG. 6. In the depicted embodiment, the authorization table 700 is made up of six fields, however, in other embodiments, an authorization table can include more or fewer fields than six.

The first and second fields of the authorization table 700 can be referred to as "Inquiring Vendor Fields." The Inquiring Vendor Fields require the subscriber to enter at least the vendor's name and employer identification number (EIN). For example, the vendor name can be a thirty-six-byte alphanumeric sequence, and the vendor EIN can be a nine-byte numeric sequence. The Inquiring Vendor Fields are used by the identity reel system to validate that the vendor is an approved inquirer and that the subscriber specifically approves them to inquire into their (the subscriber's) creditworthiness.

Figure 8:
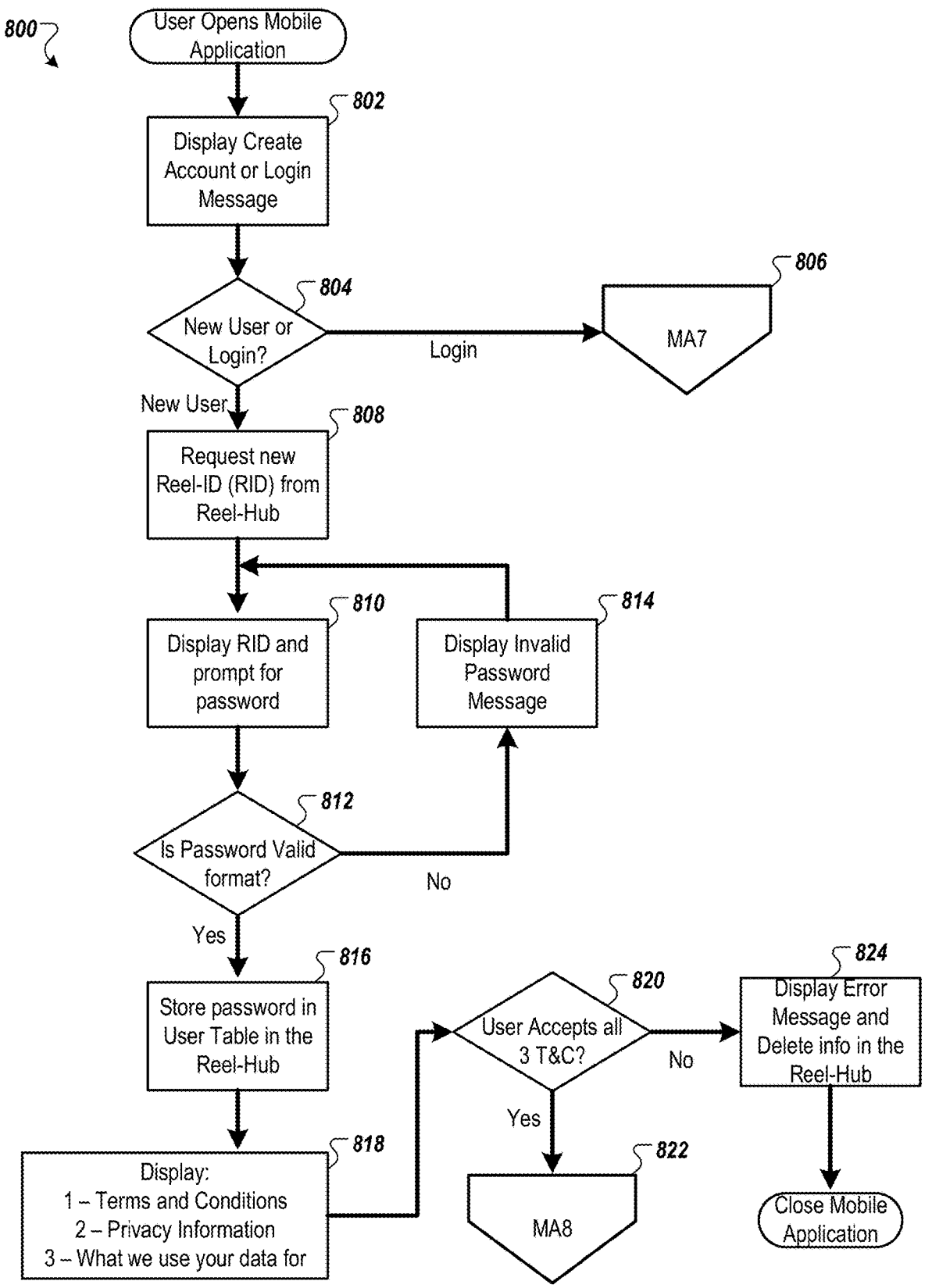
FIG. 8 is a flow diagram of a method of creating a new subscriber profile according to one embodiment.

The third and fourth fields represent the "time-allowed stamp function." A timestamp can be set by the subscriber in order to indicate a pre-determined length of time that a vendor can use an identifier token (see FIG. 6) of the subscriber. The pre-determined length of time can be an amount of time that is determined by the subscriber, or a time that is set by the identity reel system. The pre-determined time can be fixed or can be updated depending on what or who the vendor (e.g., legitimate third party) is. If the vendor fails to complete an inquiry relating to the subscriber within the pre-determined length of time, the identifier token will no longer be valid and any inquiry or transaction based on that specific identifier token will be declined. Thus a new identifier token is to be requested from the identity reel system by the subscriber. For example, in at least one embodiment, an authorization table can include as follows:

Vendor Name+EIN (XXX-XX-XXXX)+Current time stamp+Request duration period (4 hours)+Subscriber SSN+RID token FIGS. 8-12 below relate to a subscriber requesting service for a mobile application or computer and subsequently completing the setup and account verification process. In summary, when the subscriber requests service from the mobile application on a user device or computer and completes the setup and account verification process, the subscriber is assigned their user ID and a subscriber reel. The user ID and the subscriber reel are specific to the subscriber and a record of its use can be stored or logged in the subscriber's user ID entry log. The master reel of the consent-based authorization system can select a random start value (or "seed") as an alphanumeric sequence that will direct the subscriber reel where to start counting from when it begins a free-fall state. The random start value can be saved in the subscriber's reel-UID entry and log. Then, the subscriber can open a consent-based authorization system application (or similar) on a user device and log into the consent-based authorization system. The subscriber can then select an authorization menu option and complete required fields (e.g., as shown in FIG. 7). The required fields include, but are not limited to, the inquiring vendor field, the time-stamp allowed field, and/or other fields deemed necessary. After completing the required fields, the subscriber can send a request for an identifier token, and the subscriber's data is validated. The subscriber receives their identifier token, which, upon receipt, can provide it to the vendor as a way to protect and validate their social security number (or identification information). As an example, which will be further elaborated upon below, a subscriber validation can be as follows:

Vendor+EIN (XXX-XX-XXXX), Time Stamp=4 hours, User SSN+RID token or XXX-XX-XXXX+9ZQ87JM3G FIG. 8 is a flow diagram of a method 800 of creating a new subscriber profile according to one embodiment. Method 800 can be performed by processing logic comprising hardware, firmware, or any combination thereof. Method 800 can be performed by processing logic of the data structure 200 of the consent-based authorization system of FIG. 2.

Referring back to FIG. 8, the method 800 to create a subscriber reel begins by a user/subscriber opening a corresponding mobile application on a user device and the processing logic displaying a message to log in or create an account (block 802). If the subscriber chooses to log in, the processing logic at block 804 advances to a further routine (MA7) (block 806) that will be described below. If the subscriber indicates that they are a new user, the processing logic requests a user ID from a reel hub (e.g., a remote server) (block 808). The processing logic displays the user ID and a prompt for a password to be displayed (block 810). The new subscriber can then enter a password, and the processing logic determines whether a format of the password is valid or not (block 812). For example, the format of the password may require that it must include at least a certain number of characters, a certain number or numbers, uppercase letters, lowercase letters, etc. If the format of the password is not valid, the processing logic displays a message indicating that the password is invalid (block 814). For example, in some cases, certain restrictions (e.g., length, types of characters, history of old password usage, and the like) can be required of the password for the format of the password to be valid. If the format of the password is valid, the processing logic stores the password in a user table associated with the user ID in the reel hub (block 816). The processing logic displays three terms and conditions (block 818). The three terms and conditions (T&C) may be standard terms and conditions, privacy information, and what data (e.g., entered by the subscriber) is used for. The processing logic checks if the subscriber accepts all three T&C (standard terms and conditions, privacy information, and what the data is used for) (block 820). If the subscriber accepts all three T&C, the processing logic advances to a further routine (MA8) (block 822), as described below in reference to FIG. 9. If the subscriber does not accept all three T&C, the processing logic displays an error message and deletes all added information (e.g., subscriber information, password, etc.) in the reel hub (block 824) and closes the mobile application, and the method 800 ends.

Figure 9:
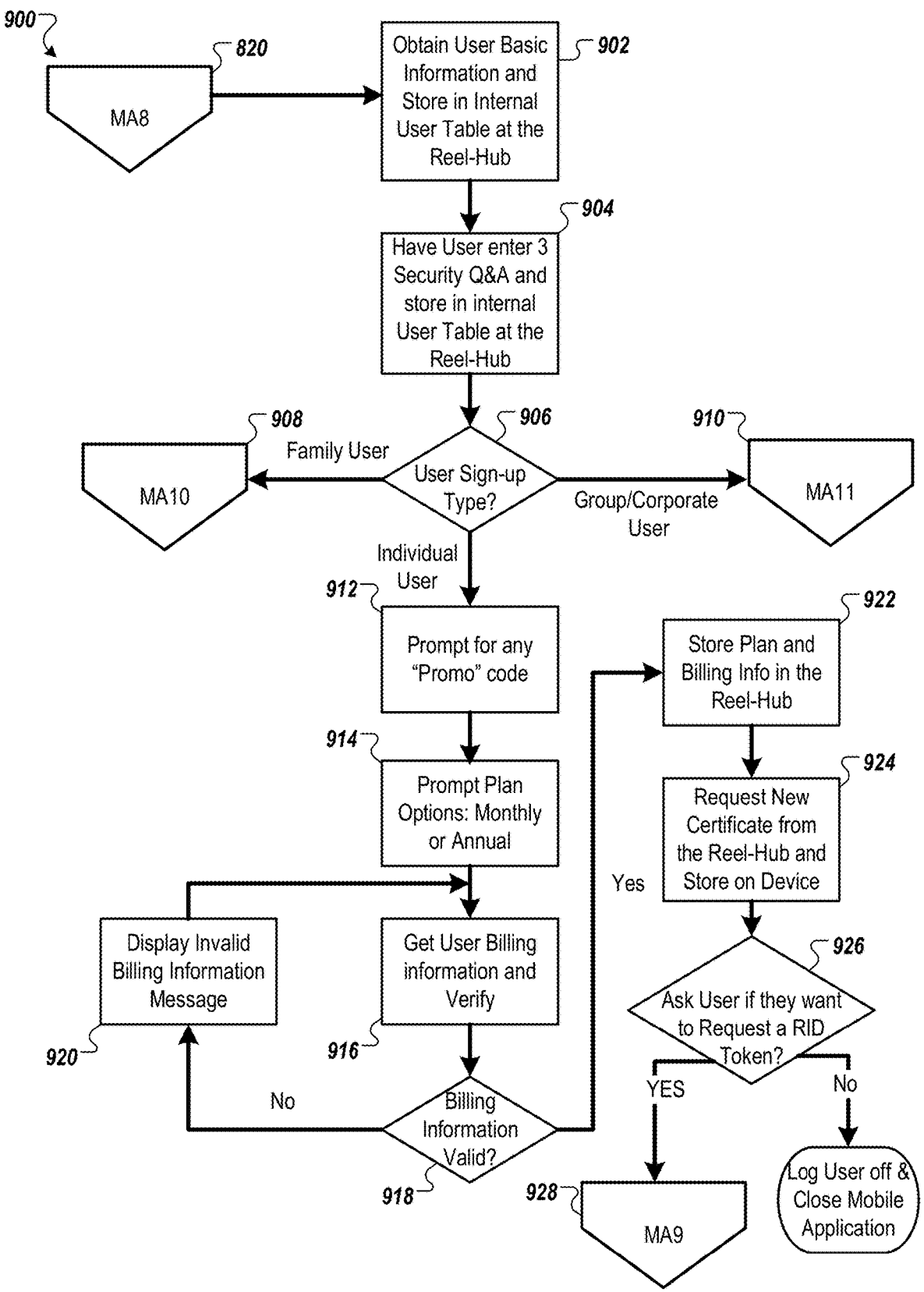
FIG. 9 is a flow diagram of a method of obtaining and storing basic user information in an internal user table at the reel hub according to one embodiment.

FIG. 9 is a flow diagram of a method 900 of obtaining and storing basic user information in an internal user table at the reel hub according to one embodiment. Method 900 can be performed by processing logic comprising hardware, firmware, or any combination thereof Method 900 can be performed by processing logic of the data structure 200 of the consent-based authorization system of FIG. 2.

Referring back to FIG. 9, the method 900 of obtaining and storing basic user information in an internal user table at the reel hub begins at block 822 of FIG. 8. The processing logic obtains a subscriber's basic information and stores it in an internal user table associated with the user ID at the reel hub (block 902). The processing logic requests that the subscriber enters three security questions and answers (Q&A) and stores the three security questions and answers in the internal user table in the reel hub (block 904). The processing logic requests a user sign-up type from the subscriber (block 906). If the subscriber is a family user, the processing logic advances to a further routine (MA10) (block 908). If the subscriber is a group or corporate user, the processing logic advances to a further routine (MA11) (block 910). If the subscriber is an individual user, the processing logic prompts the subscriber for any promotional ("promo") code (block 912). The processing logic then prompts the subscriber on whether the subscriber would like to subscribe via a monthly plan or an annual plan (block 914). The processing logic obtains and verifies user billing information from the subscriber (block 916). The processing logic determines (e.g., by checking with a remote server or by other means) if the billing information is valid (block 918). If the billing information is invalid, the processing logic displays a message indicating that the billing information is invalid (block 920). If the billing information is valid, the processing logic stores the plan (e.g., subscription plan) and the billing information associated with the subscriber in the internal user table at the reel hub (block 922). The processing logic requests new certificate information from the reel hub and stores it on the device (e.g., such as a user device or a mobile device of the subscriber) (block 924). The processing logic inquires to the subscriber if they would like to request an identifier token (block 926). If the subscriber would like to request an identifier token, the processing logic advances to a further routine (MA9) to request the identifier token (block 928). If the subscriber does not want or need to request an identifier token, the method 900 ends.

Figure 10:
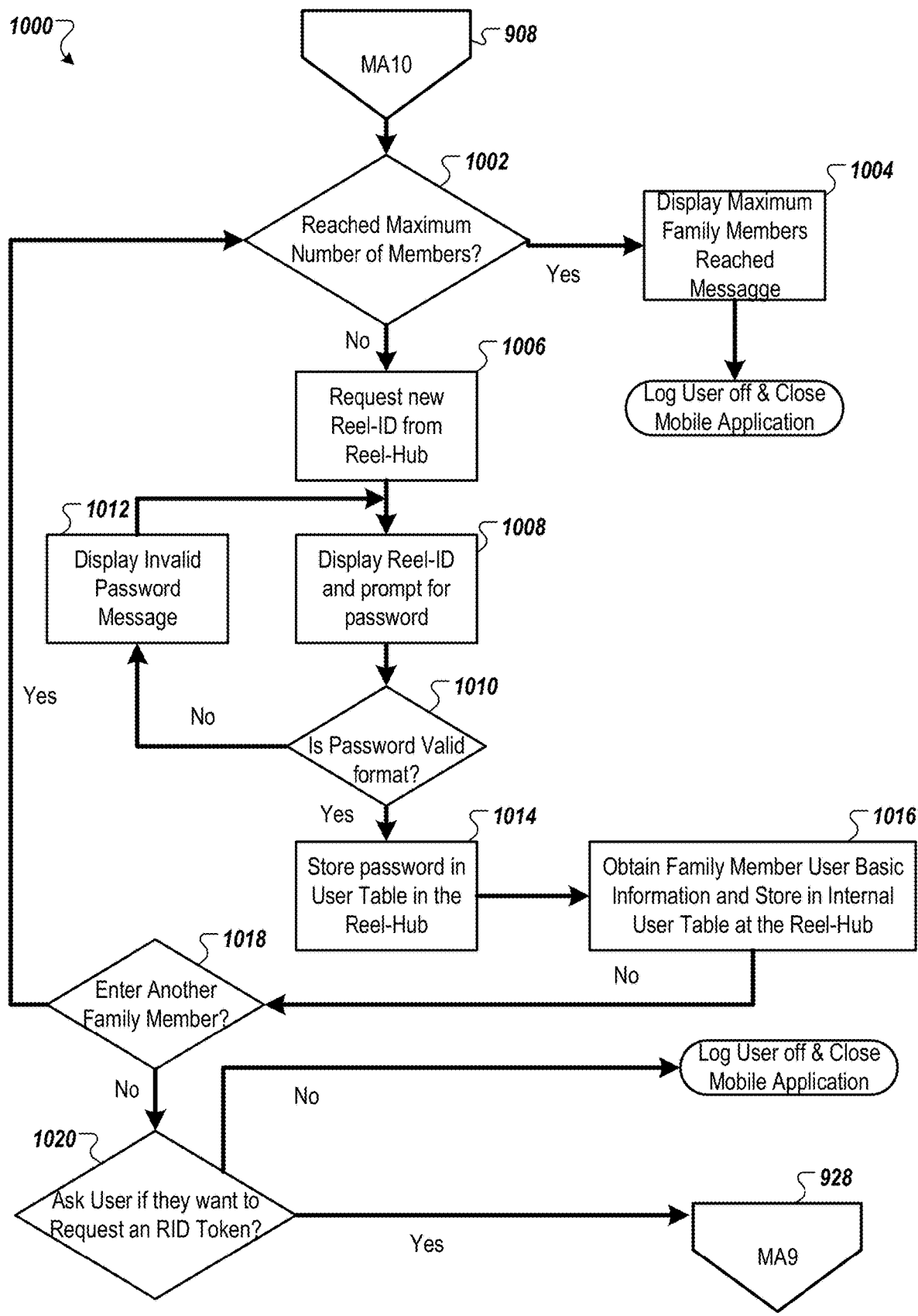
FIG. 10 is a flow diagram of a method of obtaining and storing basic user information to a family account in an internal user table at the reel hub according to one embodiment.

FIG. 10 is a flow diagram of a method 1000 of obtaining and storing basic user information to a family account in an internal user table at the reel hub according to one embodiment. Method 1000 can be performed by processing logic comprising hardware, firmware, or any combination thereof. Method 1000 can be performed by processing logic of the data structure 200 of the consent-based authorization system of FIG. 2.

Referring back to FIG. 10, the method 1000 of obtaining and storing basic user information to a family account in an internal user table at the reel hub begins at block 908 (MA10) of FIG. 9. In this case, the new subscriber is subscribing to a family account. The processing logic checks whether the family account has reached a maximum number of members (block 1002). If the maximum number of members has been reached, the processing logic displays a message indicating that the maximum number of family members has been reached (block 1004), and the user is logged off and the mobile application is closed; the method 1000 ends. If the maximum number of family members has not yet been reached, the processing logic requests a new RID from the reel hub (block 1006). The processing logic displays the RID and prompts the new subscriber for a password (block 1008). The processing logic checks if a format of the password is valid (block 1010). If the format of the password is invalid, the processing logic displays a message indicating that the password is invalid (block 1012). The processing logic then performs operations of blocks 1008 and 1010 until it determines that the password has a valid format. For example, in some cases, certain restrictions (e.g., length, types of characters, history of old password usage, and the like) can be required of the password for the format of the password to be valid. Once the format of the password meets the criterion for being valid, the processing logic stores the password in the user table in the reel hub (block 1014). The processing logic obtains a basic user information of the family member (e.g., the new subscriber) and stores it in the internal user table at the reel hub (block 1016). The processing logic inquires whether an additional new family member is to be added (block 1018). If another family member is to be added, the processing logic performs the operations of blocks 1002 to 1018 until there are no other family members to be added. The processing logic asks the subscriber if they want to request an identifier token (block 1020). If the subscriber does not want or need to request an identifier token, the processing logic logs the subscriber off and closes the mobile application; the method 1000 ends. If the subscriber does want or need to request an identifier token, the processing logic advances to a further routine (MA9) to request an identifier token (block 928).

Figure 11:
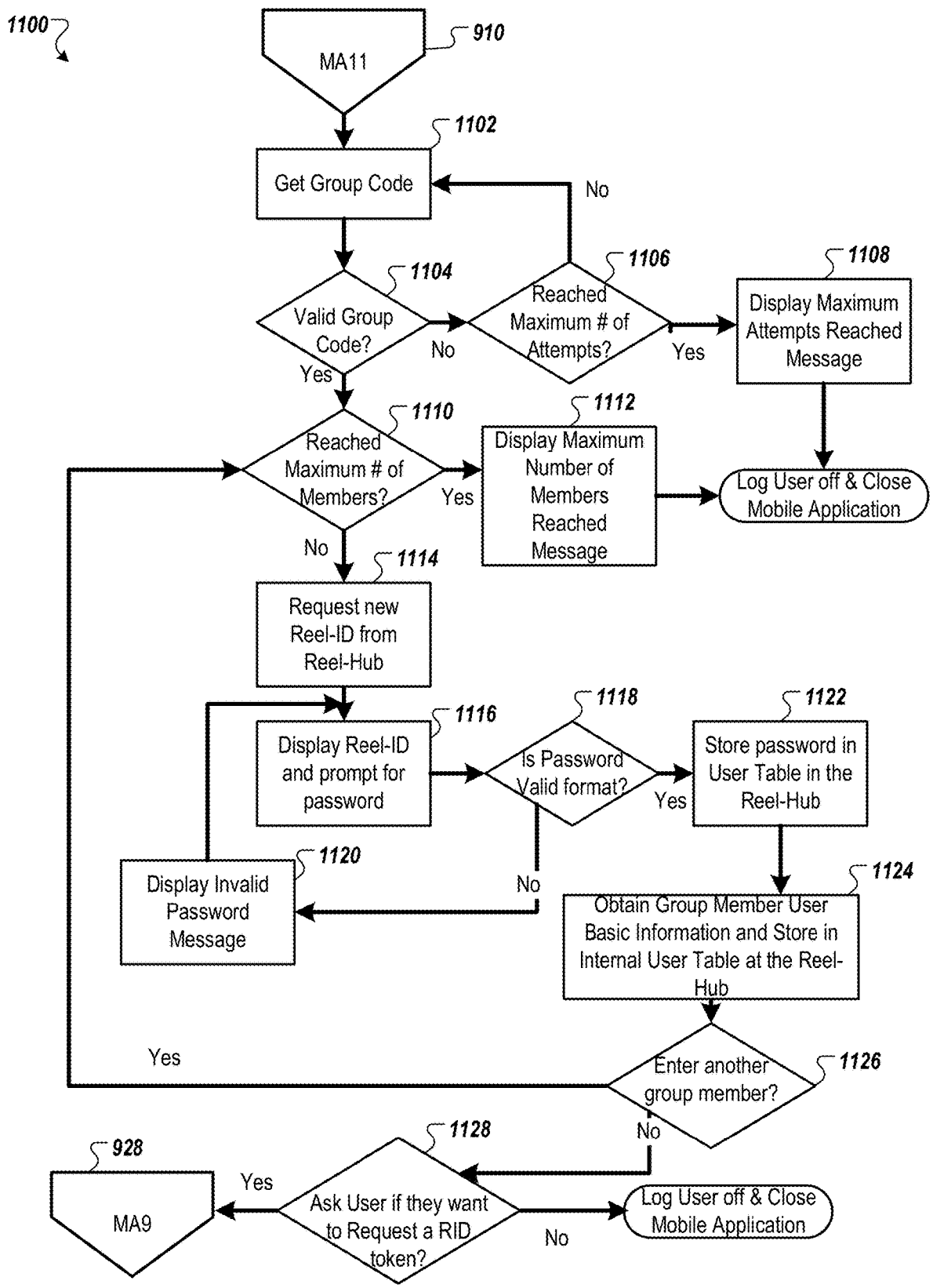
FIG. 11 is a flow diagram of a method of obtaining and storing basic user information to a group account in an internal user table at the reel hub according to one embodiment.

FIG. 11 is a flow diagram of a method 1100 of obtaining and storing basic user information to a group account in an internal user table at the reel hub according to one embodiment. Method 1100 can be performed by processing logic comprising hardware, firmware, or any combination thereof. Method 1100 can be performed by processing logic of the data structure 200 of the identity validation of system FIG. 2.

Referring back to FIG. 11, the method 1100 of obtaining and storing basic user information to a group account in an internal user table at the reel hub begins at block 910 (MA10) of FIG. 9. The processing logic obtains a group code from the new subscriber (block 1102). The processing logic determines whether or not the group code is valid (block 1104). If the group code is not valid, the processing logic determines whether a maximum number of attempts has been made by the new subscriber to enter a correct group code (block 1106). If the maximum number of attempts has not been made, the processing logic repeats operations of blocks 1102 and 1104 until either a valid group code is entered or a maximum number of attempts has been reached. When the maximum number of attempts has been reached, the processing logic displays a message indicating that the maximum number of attempts has been reached (block 1108). The processing logic logs the user off and closes the mobile application; the method 1100 ends.

However, if a valid group code is provided at the operation of block 1104, the processing logic checks if the group account has reached a maximum number of members (block 1110). If the maximum number of members for the group account has been reached, the processing logic displays a message indicating that the maximum number of members has been reached (block 1112). The processing logic logs the user off and closes the mobile application; the method 1100 ends. If the maximum number of group members has not been reached at the operation of block 1110, the processing logic requests a new user ID from the reel hub (block 1114). The processing logic displays the user ID and prompts the new subscriber for a password (block 1116). The processing logic checks if a format of the password is valid (block 1118). If the format of the password is invalid, the processing logic displays a message indicating that the password is invalid (block 1120). The processing logic then performs the operations of blocks 1116 and 1118 until it determines that the password has a valid format. For example, in some cases, certain restrictions (e.g., length, types of characters, history of old password usage, and the like) can be required of the password for the format of the password to be valid. Once the format of the password meets the criterion for being valid, the processing logic stores the password in the user table in the reel hub (block 1122). The processing logic obtains a basic user information of the group member (e.g., the new subscriber) and stores it in the internal user table at the reel hub (block 1124). The processing logic inquires whether an additional new group member is to be added (block 1126). If another group member is to be added, the processing logic performs the operations of blocks 1110 to 1126 until there are no other group members to be added. The processing logic asks the subscriber if they want to request an identifier token (block 1128). If the subscriber does not want or need to request an identifier token, the processing logic logs the subscriber off and closes the mobile application; the method 1100 ends. If the subscriber does want or need to request an identifier token, the processing logic advances to a further routine (MA9) to request an identifier token (block 928).

Figure 12:
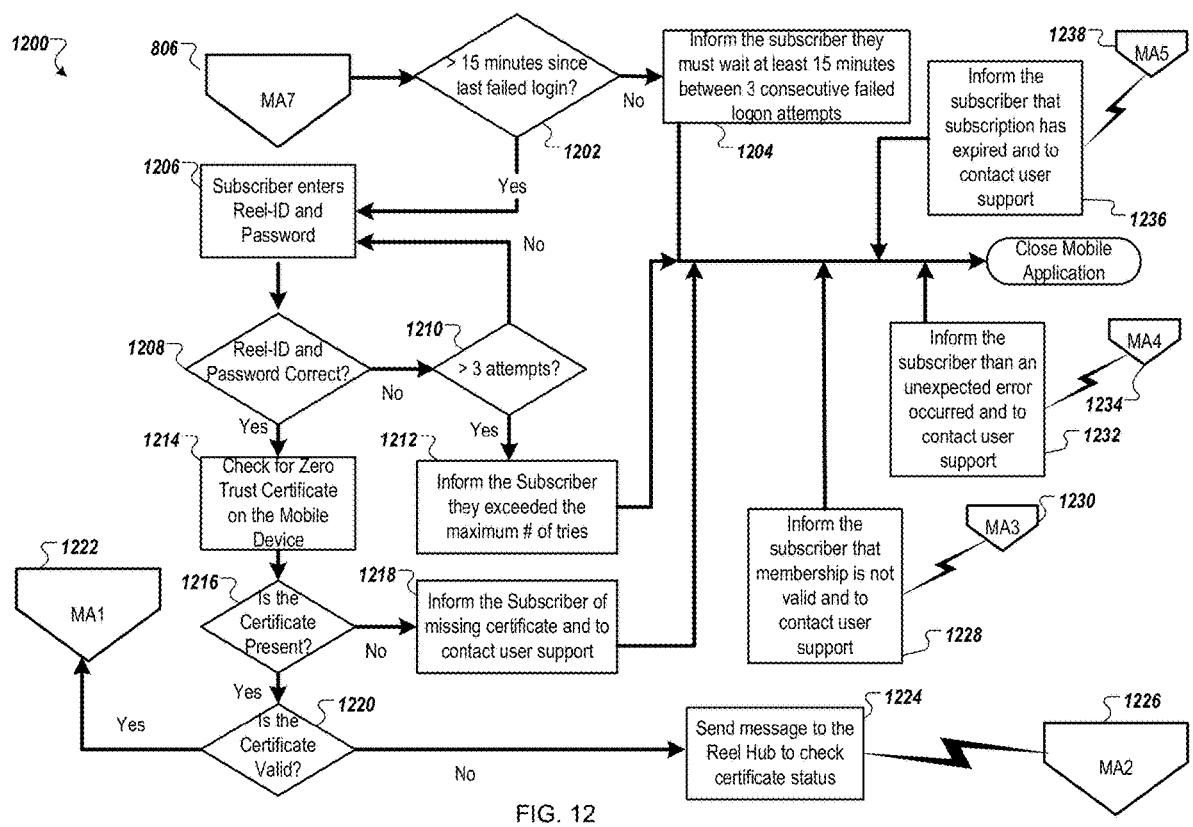
FIG. 12 is a flow diagram of a method verifying a subscriber device according to one embodiment.

FIG. 12 is a flow diagram of a method 1200 verifying a subscriber device according to one embodiment. Method 1200 can be performed by processing logic comprising hardware, firmware, or any combination thereof. Method 1200 can be performed by processing logic of the data structure 200 of the consent-based authorization system of FIG. 2.

Referring back to FIG. 12, the method 1200 of verifying a subscriber device begins at block 806 (MA7) of FIG. 8. The method 1200, starting at block 806 (MA7) is performed after a subscriber logs into their identity reel account. The processing logic determines if a time greater than threshold time has elapsed since the last failed login attempt (block 1202). In the depicted example, the threshold time is 15 minutes, and the processing logic determines whether or not the time since the last failed login attempt exceeds 15 minutes. In other embodiments, the threshold time can be another time different than 15 minutes. If the elapsed time has not yet exceeded 15 minutes (the threshold time), the processing logic informs the subscriber that they must wait at least 15 minutes between three consecutive failed login attempts (block 1204). The processing logic closes the mobile application and the method 1200 ends. If, at block 1202, the processing logic determines that the elapsed time since the last failed login attempt is greater than 15 minutes, the processing logic allows the subscriber to re-enter the user ID and password (block 1206). The processing logic determines whether or not the user ID and password are correct (block 1208). If the password is incorrect, the processing logic determines whether there have been greater than three failed attempts to log in (block 1210). If there have not been greater than three failed attempts to log in, the processing logic returns to the operation of block 1206 and allows the subscriber to re-attempt to enter their user ID and password. If there have been greater than three failed attempts to log in, the processing logic informs the subscriber that they have exceeded the maximum number of tries (e.g., three in this example) (block 1212) and the processing logic closes the mobile application; the method 1200 ends. Although the maximum number of tries is depicted herein as three, in other embodiments, the maximum number of tries can be one, two, four, or other reasonable value. In some embodiments, there does not need to be a maximum number of tries.

Once the processing logic has determined that the subscriber has entered a correct RID and password at block 1208, the processing logic checks for a certificate (e.g., such as a zero trust certificate, an X.509 certificate, or the like) on the mobile device (block 1214) and determines whether or not the certificate is present (block 1216). The certificate may be an X.509 third-party type certificate that is stored on both the user device of the subscriber and in the user profile that is stored at the consent-based authorization system remote server. If the certificate is not present, the processing logic informs the subscriber that the certificate is missing and to contact user support (block 1218). The processing logic closes the mobile application and the method 1200 ends.

If the processing logic has determined that the certificate is present at block 1216, the processing logic checks if the certificate is valid (block 1220). For example, the certificate stored on the user device of the subscriber and the certificate stored at the consent-based authorization system must match. Further, in some embodiments the certificate may be valid for a period of one year or until a subscription is expired or ended, whichever is sooner. In other embodiments the certificate may be valid for more or less than one year (e.g., six months, nine months, two years, or other appropriate amount of time) or until a subscription is expired or ended, whichever is sooner. If the certificate is valid, the processing logic advances to a further routine (MA1) (block 1222), which will be described below. If the processing logic determines that the certificate is not valid, the processing logic sends a message to the reel hub to check a status of the certificate (block 1224). The processing logic then advances to a further routine (MA2) (block 1226). It is worth noting that if the subscriber is still an active subscriber after a period that the certificate remains valid (e.g., one year), the consent-based authorization system can generate a new certificate for the subscriber that is automatically installed on the user device of the subscriber and the user profile of the subscriber.

Figure 13:
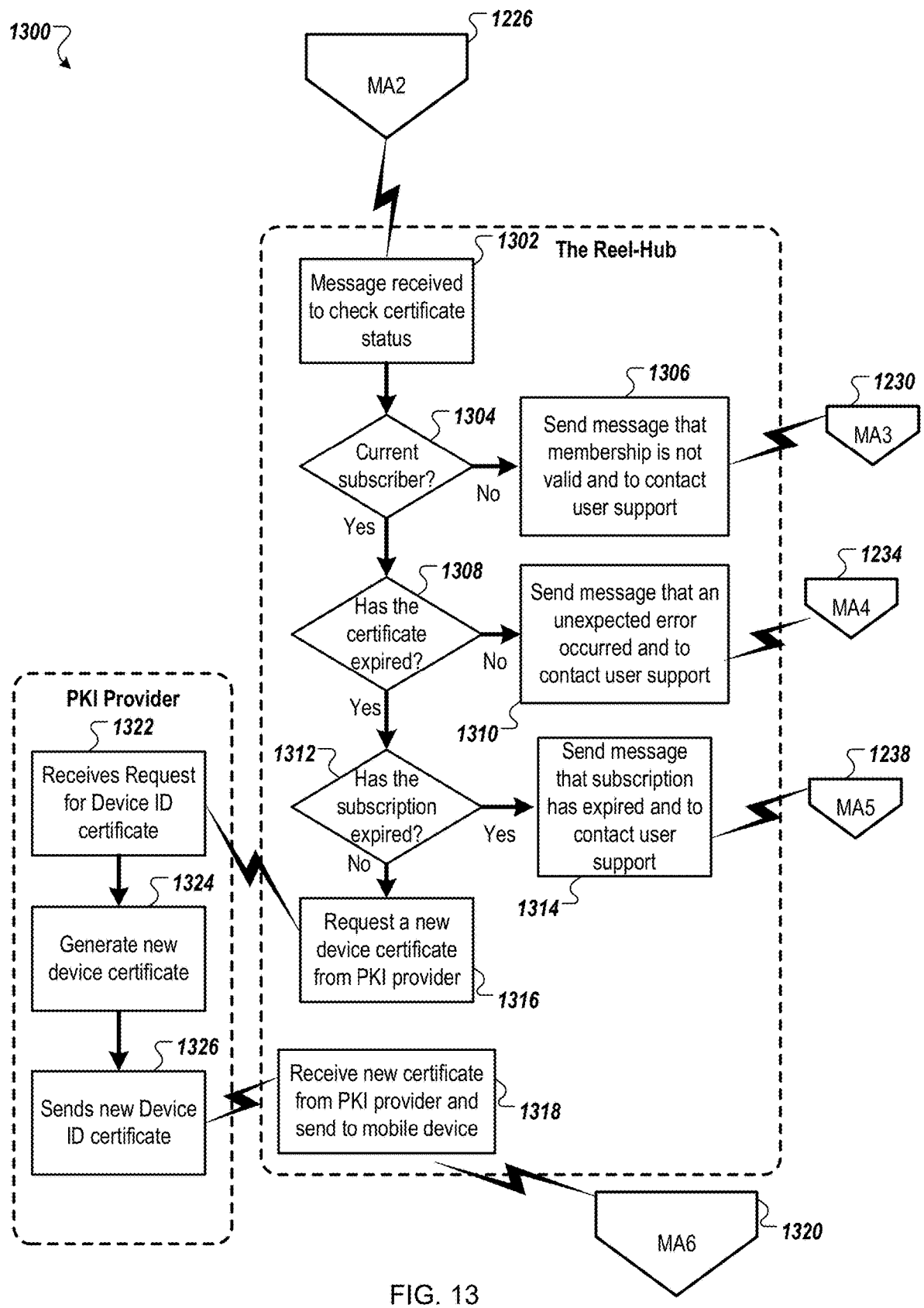
FIG. 13 is a flow diagram of a method of further verifying a subscriber device according to one embodiment.

Additional errors as described with respect to FIG. 13 can occur during the method 1200 to verify the subscriber device. For example, if the subscriber is not a current subscriber at block 1230, the processing logic can send a message to inform the subscriber that their membership is not valid and to contact user support (block 1228). The processing logic then closes the mobile application. Additionally or alternatively, if the certificate has expired at block 1324 of FIG. 13, the processing logic can send a message to inform the subscriber that an unexpected error has occurred and to contact user support (block 1232). The processing logic then closes the mobile application. Additionally or alternatively, if the subscriber's subscription has expired at block 1338 of FIG. 13, the processing logic can send a message to inform the subscriber that their subscription has ended and to contact user support (block 1236). The processing logic then closes the mobile application.

FIG. 13 is a flow diagram of a method 1300 of further verifying a subscriber device according to one embodiment. Method 1300 can be performed by processing logic comprising hardware, firmware, or any combination thereof. Method 1300 can be performed by processing logic of the data structure 200 of the consent-based authorization system of FIG. 2.

Referring back to FIG. 13, the method 1300 of further verifying a subscriber device begins at block 1226 (MA2) of FIG. 12. The method 1300, starting at block 1226 (MA2) is performed after the processing logic sends a message to the reel hub to check a status of the certificate (block 1224 of FIG. 12). The processing logic receives a message indicating that the processing logic is to check a certificate status (block 1302). The certificate status can refer to a status of a zero-trust certificate on the mobile device in some embodiments. The processing logic checks if the corresponding subscriber (e.g., associated with the mobile device being verified) is a current subscriber (block 1304). If the subscriber is not a current subscriber, the processing logic returns a message that a membership of the subscriber is not valid and the subscriber should contact user support (block 1306). The processing logic advances to routine MA3 (block 1230) as described with respect to FIG. 12. If the processing logic determines that the subscriber is a current subscriber at block 1304, the processing logic checks if the certificate is expired (block 1308). If the certificate is not expired, the processing logic sends a message to the device indicating that an unexpected error has occurred and the subscriber should contact user support (block 1310). The processing logic advances to routine MA4 (block 1234) as described with respect to FIG. 12. If the certificate has not expired, the processing logic checks if the subscription is expired (block 1312). If the subscription is expired, the processing logic sends a message to the device being verified that the subscription has expired and the subscriber should contact user support (block 1314). The processing logic then advances to routine MA5 (block 1238) as described with respect to FIG. 12. If the subscription has not expired, the processing logic can request a new device certificate from a public key infrastructure (PKI) provider (block 1316). The processing logic then receives a new certificate from the PKI Provider and sends the new certificate to the mobile device (block 1318). The processing logic advances to routine MA6 (block 1320).

The PKI can have its own processing logic (e.g., the PKI processing logic) which performs functions at least to generate a new certificate for the processing logic of the reel hub (e.g., the processing logic). When the processing logic requests a new device certificate from the PKI provider, the PKI processing logic receives the request for a device ID certificate (block 1322). The PKI processing logic generates a new device ID certificate (block 1324) and sends the new device ID certificate to the processing logic (block 1526). The processing logic receives the new certificate from the PKI processing logic at block 1318.

Figure 14:
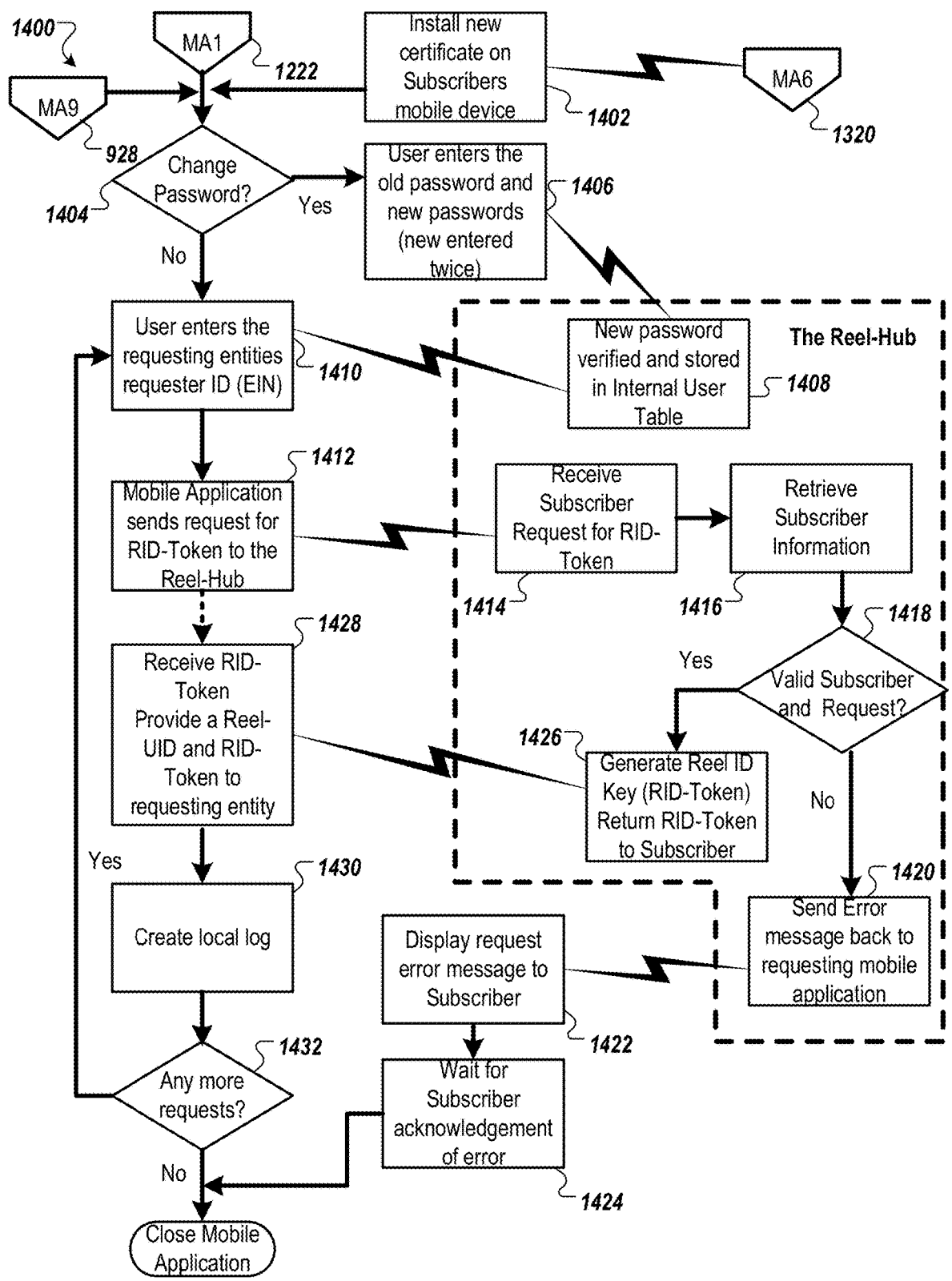
FIG. 14 is a flow diagram of a method of handling a subscriber identifier token request according to one embodiment.

FIG. 14 is a flow diagram of a method 1400 of handling a subscriber identifier token request according to one embodiment. Method 1400 can be performed by processing logic comprising hardware, firmware, or any combination thereof. Method 1400 can be performed by processing logic of the data structure 200 of the consent-based authorization system of FIG. 2.

Referring back to FIG. 14, the method 1400 of handling a subscriber identifier token request begins at block 928 (MA9) of at least FIGS. 9-12, block 1222 (MA1) of FIG. 12, and/or block 1320 (MA6) of FIG. 13. The method 1400, performed when the processing logic receives a request from a subscriber for an identifier token (e.g., at block 1320 (MA6)). The processing logic can install a new certificate on a mobile device of the subscriber (block 1402). Additionally or alternatively the processing logic can determine if the subscriber has requested to change the password on their account (block 1404). If the subscriber would like to change their password, a processing logic of the reel hub (e.g., the reel hub processing logic) can verify and store the new password in the internal user table (block 1408) after the subscribers enters their old password (correctly) and enters the new password at least twice (block 1406). If the subscriber does not want to change their password, they can enter an EIN (block 1410). A mobile device of the subscriber can send a request to the reel hub for an identifier token (block 1412). The reel hub processing logic receives the subscriber request for an identifier token (block 1414) and retrieves sensitive information about the subscriber (block 1416). The reel hub processing logic checks if the subscriber is a valid subscriber, and if the request from the subscriber is valid (block 1418). If the request is invalid, the reel hub processing logic sends an error message back to the mobile application on the subscriber's device (block 1420). The processing logic of the mobile device of the subscriber then receives the error message and displays it to the subscriber (block 1422). The processing logic waits for the subscriber to acknowledge a receipt of the error message (e.g., via clicking on a touch display, by a voice command, or by another means) (block 1424). The processing logic closes the mobile application and the method 1400 ends.

Alternatively, if at the operation of block 1418, the reel hub processing logic determines that the subscriber and the corresponding identifier token request is valid, the reel hub processing logic generates an identifier token (e.g., a Reel ID Key) and returns it to the subscriber (via the subscriber's mobile device) (block 1426). The processing logic of the mobile device receives the identifier token which can then be provided, along with a user ID to the requesting entity (such as a business, dealership, government entity or other legitimate third parties) (block 1428). The identity validation system then compares the identifier token to a second identifier token that is received from a device associated with the requesting entity and checks if they match. The information is only validated if the identifier token and the second identifier token are matching. The mobile device can create a local log to store such a transaction (block 1430) and inquire to the subscriber whether they need to make other requests for any more identifier tokens (block 1432). If the subscriber does need to make more requests, the processing logic (both of the mobile device and the reel hub) performs operations 1410-1432 again. If the subscriber does not need to make any more requests, the processing logic of the mobile device closes the mobile application, and the method 1400 ends.

FIGS. 15A-15D illustrate a flow diagram of a credit check authorization process according to one embodiment. It should be noted that one aspect of the approach for the authorization process is the use of a "reliance authentication" rather than a Multi-Factor (MFA) or Two-Factor (2FA) process. MFA and/or 2FA are methods in which a user is granted access to a system after presenting two or more "factors" to that system's authentication mechanism. This is usually something that a user has or knows, or somewhere that they are. These methods are used to directly access a particular system which is not the case during the Identity Reel process. Method 1500 can be performed by processing logic comprising hardware, firmware, or any combination thereof. Method 1500 can be performed by processing logic of the data structure 200 of the consent-based authorization system of FIG. 2

Figure 15A:
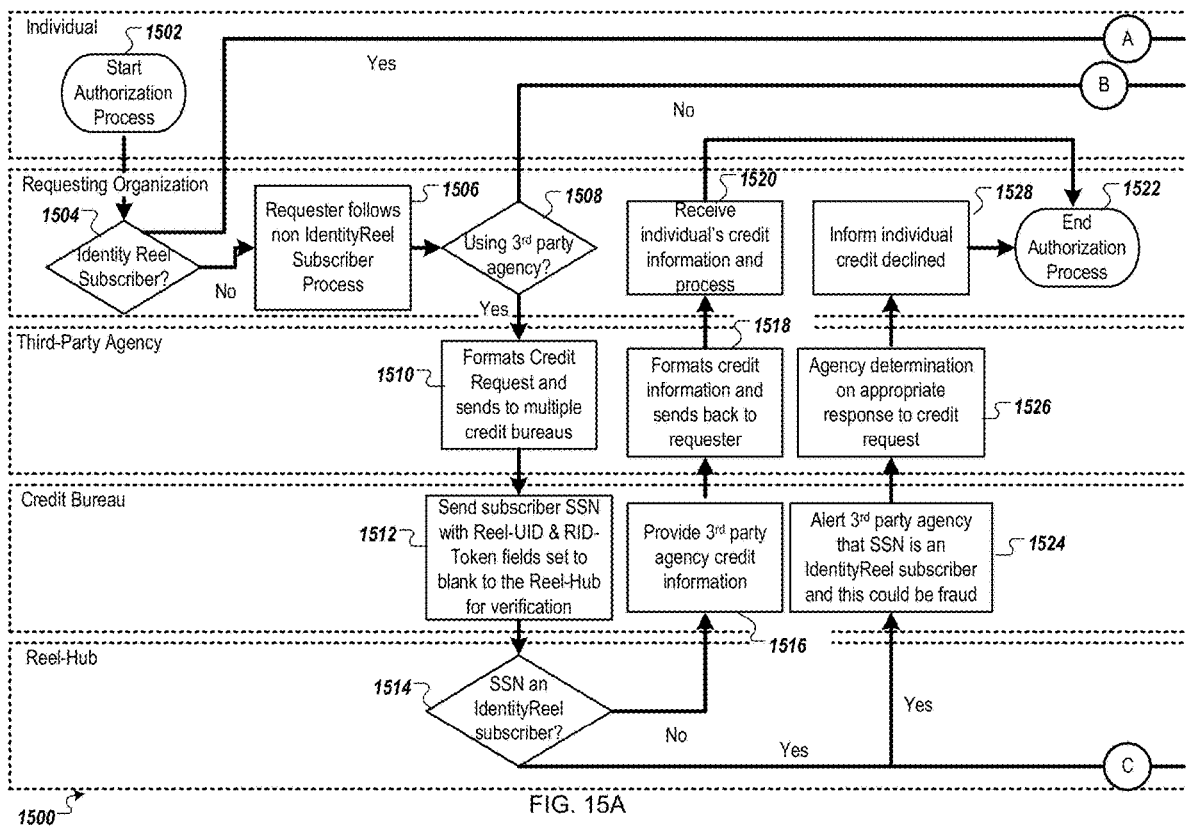
FIGS. 15A-15D illustrate a flow diagram of a credit check authorization process according to one embodiment.
Figure 15B:
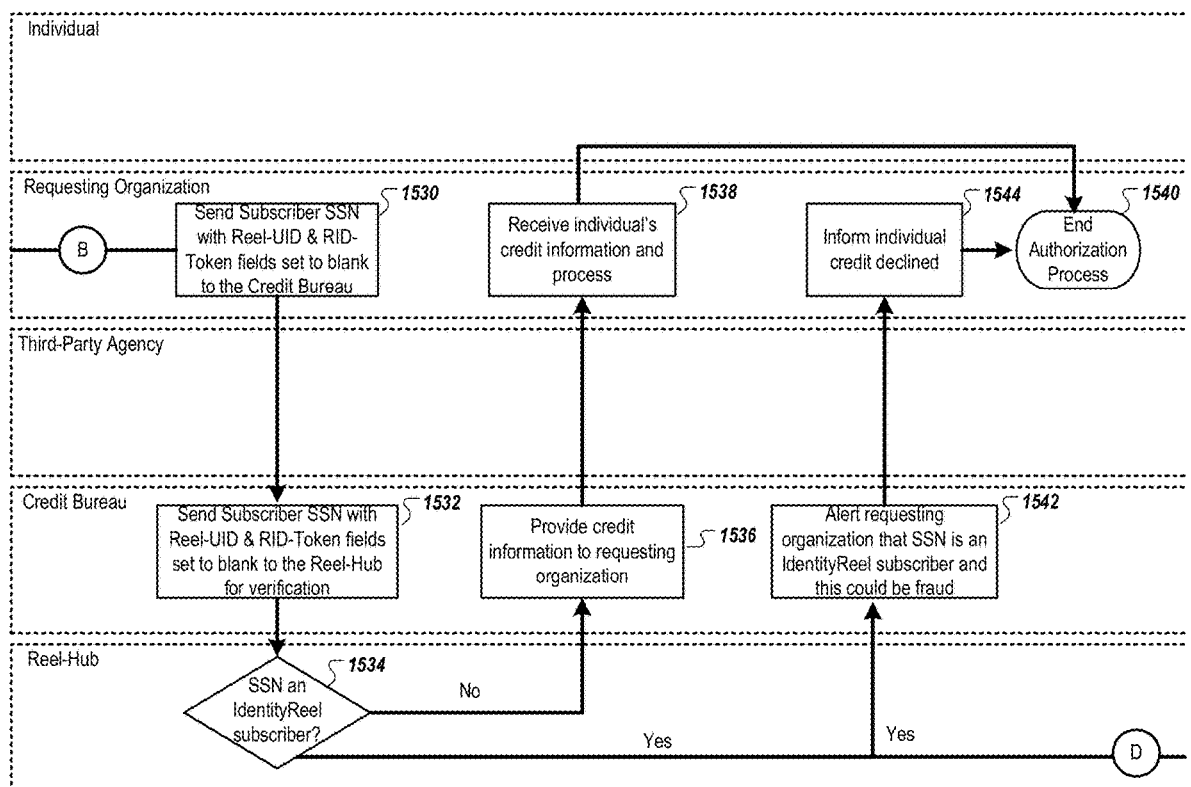

FIGS. 15A-15B relate to a case in which an individual who is not a subscriber to the consent-based authorization system attempts to initiate a credit check authorization process. It should be noted that lettered circles (e.g., A-F) indicate flowchart lines that are extended between FIGS. 15A-15D. A credit check authorization process can be initiated by an individual who may or may not be a subscriber to a consent-based authorization system (block 1502). In a first example, the individual is not a subscriber to the consent-based authorization system (determined at block 1504 by a requesting organization). The requesting organization can be a mobile application on the subscriber's user device for example. However, the individual can still follow a process that is designed for individuals who have not subscribed to identity reel but still would like to initialize a secure credit check authorization (block 1506). The requesting organization determines whether the individual is to initialize a transaction using a third-party agency (block 1508).

If the individual is using a third-party agency, then the third-party agency can format a credit request which can be sent to one or more credit bureaus (block 1510). The one or more credit bureaus then receive the request and can send a social security number of the individual, along with a user ID and identifier token fields (which are, by default, blank) to the reel hub for verification (block 1512). The reel hub then checks whether or not the social security number of the individual corresponds to a consent-based authorization system subscriber (block 1514).

If the social security number does not correspond to a subscriber of the consent-based authorization system, the reel hub can still provide the third-party agency credit information regarding the individual (block 1516). The third party agency then formats the credit information and sends it back to the requesting organization (block 1518), which receives and processes the individual's credit information (block 1520), at which the authorization process ends (block 1522).

However, on the other hand, if the social security number received by the reel hub corresponds to a subscriber of the consent-based authorization system, while the credit check authorization had been initialized by an individual who was not a subscriber of the consent-based authorization system (e.g., as determined in block 1504), then the credit bureau can alert the third party that the social security number belongs to a consent-based authorization system subscriber, and thus the request could be potentially fraudulent (block 1524). This allows the third-party agency to be alerted and determine an appropriate response to the credit request from the individual (block 1526). In some cases, the third-party agency determines to assume that the request was fraudulent and to inform the individual as such and decline the credit check request (block 1528), and end the authorization process (block 1522).

In some cases, the requesting organization may decide to bypass the use of a third-party agency (e.g., as determined in block 1508). In such cases, the requesting organization can directly send the subscriber's social security number along with the user ID and the identifier token fields set blank to the credit bureau (block 1530). Upon receiving the above-mentioned information, the credit bureau can send it to the reel hub for verification (block 1532). The reel hub then checks whether or not the social security number of the individual corresponds to a consent-based authorization system subscriber (block 1534).

If the social security number does not correspond to a subscriber of the consent-based authorization system, the reel hub can still provide the credit bureau the credit information regarding the individual (block 1536). The requesting organization receives and processes the individual's credit information from the credit bureau (block 1538), at which the authorization process ends (block 1540).

However, on the other hand, if the social security number received by the reel hub corresponds to a subscriber of identity reel, while the credit check authorization had been initialized by an individual who was not a subscriber of the consent-based authorization system (e.g., as determined in block 1504), then the credit bureau can be alerted (block 1542) and can subsequently alert the requesting organization that the social security number belongs to a consent-based authorization system subscriber, and thus the request could be potentially fraudulent at which point the requesting organization can inform the individual as such and decline the credit check request (block 1544), and end the authorization process (block 1540). Furthermore, if in any case, the provided social security number does belong to a consent-based authorization system subscriber (decided in blocks 1514 and 1534), the individual who is subscribed to the consent-based authorization system and whose social security number has been provided is altered to a potential fraud (block 1594, illustrated in FIG. 15D).

Figure 15C:
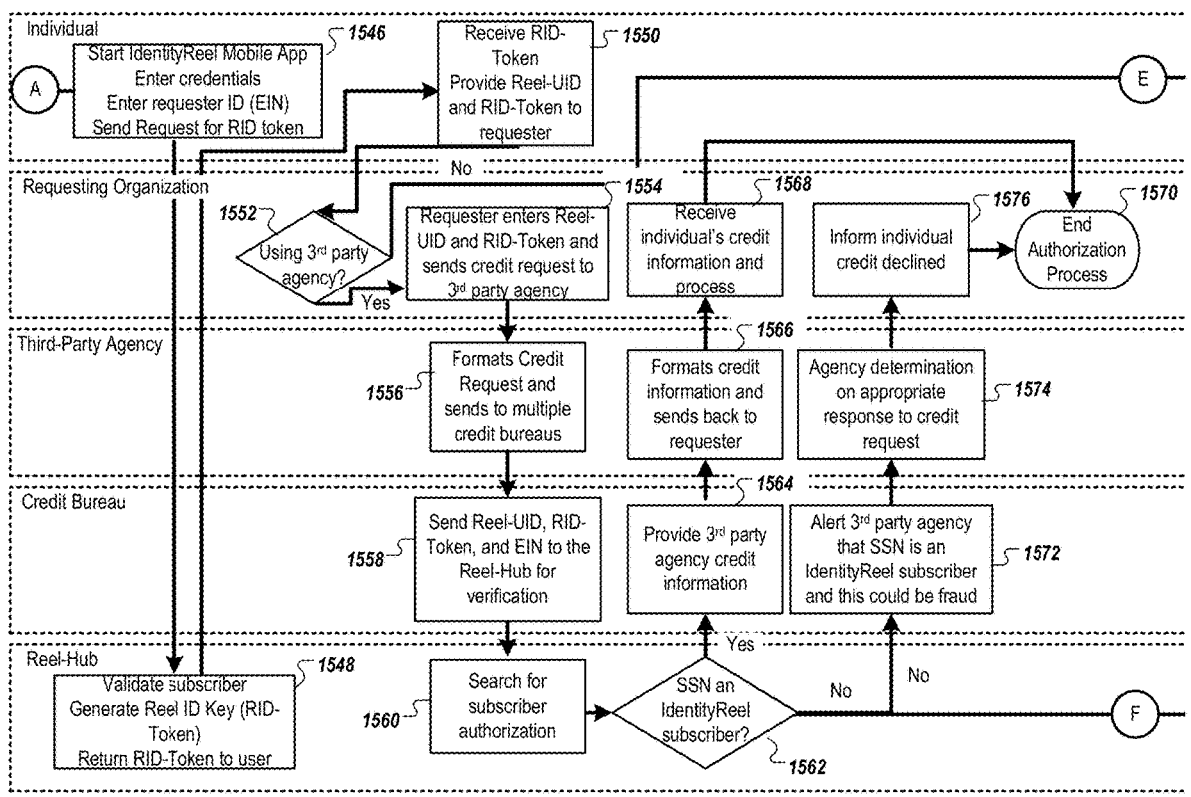

FIG. 15C relates to a case in which an individual who is a consent-based authorization system subscriber attempts to initiate a credit check authorization process. At block 1504, the requesting organization can determine that the individual is a subscriber. Thus, the individual can start their mobile application for the consent-based authorization system, for example on their user device or mobile device, and enter credentials (such as an EIN), which are used to validate the subscriber and send the reel hub a request for an identifier token (block 1546). The reel hub receives the request and validates the subscriber based on the credentials. Upon validating the subscriber, the reel hub generates an identifier token that can be returned to the individual (block 1548). The individual receives the identifier token and can then provide the identifier token as well as their user ID to the requesting organization (block 1550) which then needs to determine whether the individual would like to use a third-party agency to perform the credit check (block 1552).

If the individual would like to use a third-party agency, the requesting organization can enter the user ID and the identifier token and send that to the third-party agency (block 1554). The third-party agency can then format the credit request and send it to one or more credit bureaus (block 1556), which can then send the user ID, the identifier token, and the EIN to the reel hub for verification (block 1558). The reel hub then searches for a subscriber authorization (block 1560). If the authorization is valid (block 1562), then the credit bureau can provide the third-party agency the credit information (block 1564). The third-party agency formats the credit information and sends it back to the requesting organization (block 1566). The requesting organization receives the individual's credit information, processes it (block 1568), and ends the authorization process (block 1570).

However, on the other hand, if at block 1562, the reel hub determines that the subscriber authorization is not valid, the credit bureau can alert the third-party agency that the request could be fraudulent (block 1572). The credit bureau can send that information to the third-party agency which then determines an appropriate response to the credit request (block 1574), which may including informing the requesting organization that the individual's credit check request is declined (block 1576), at which point the authorization process is ended (block 1568). Furthermore, if the individual is a subscriber to the consent-based authorization system, they are alerted of a potential fraud (block 1596, illustrated in FIG. 15D).

Figure 15D:
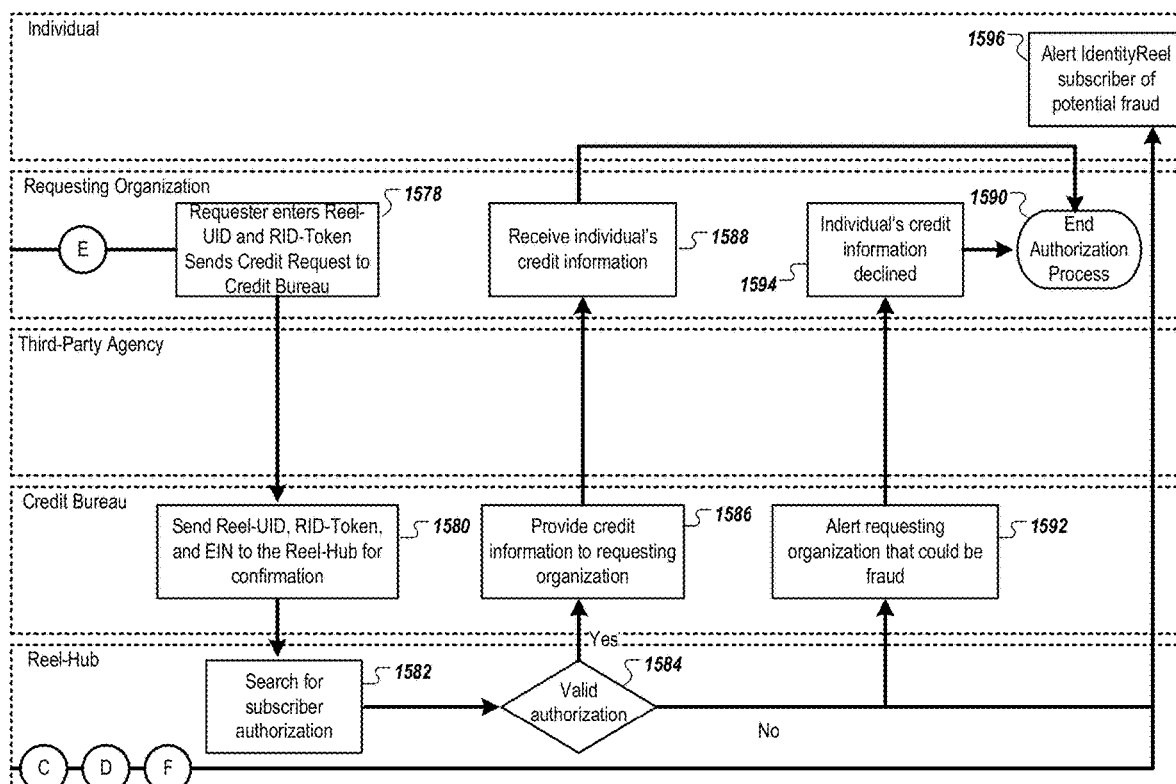

FIG. 15D is an extension of FIGS. 15A-15C, in which the individual does not need to use a third-party agency to perform the credit check authorization (decided in block 1552). In this case, the requesting organization enters the user ID and identifier token and sends the credit check authorization request directly to the credit bureau (block 1578). The credit bureau, upon receiving the request, sends the user ID, the identifier token, and the EIN to the reel hub for verification (block 1580). The reel hub then searches for a subscriber authorization (block 1582). If the authorization is valid (block 1584), then the credit bureau can provide the requesting organization the credit information (block 1586), which receives the individual's credit information (block 1588), and the authorization process ends (block 1590).

However, on the other hand, if at block 1584, the reel hub determines that the subscriber authorization is not valid, the credit bureau can alert the requesting organization that the request could be potentially fraudulent (block 1592). The credit bureau can send that information to the requesting organization which declines the credit check request (block 1594) at which point the authorization process is ended (block 1590). Furthermore, if the individual is a subscriber to the consent-based authorization system, they are alerted of a potential fraud (block 1596).

Figure 16:
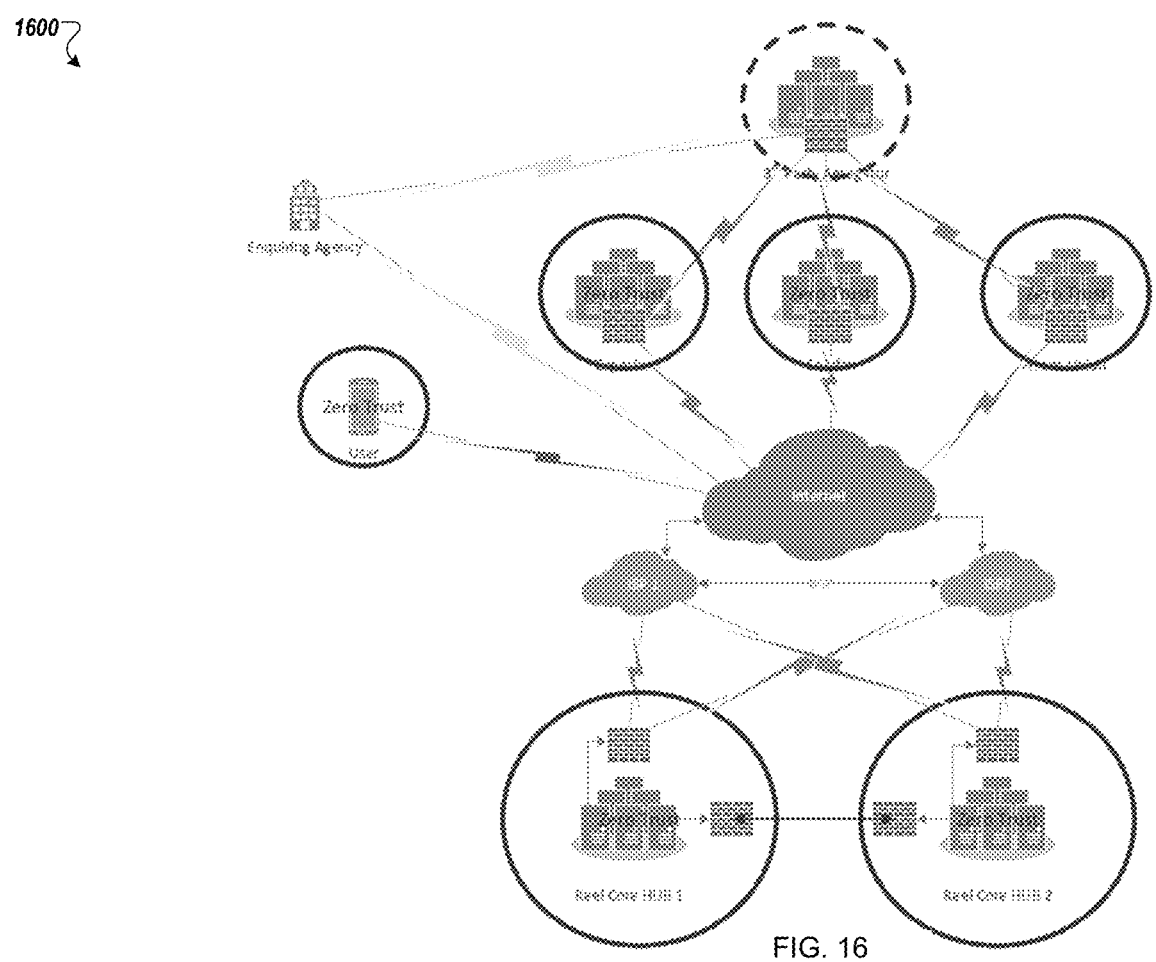
FIG. 16 is a schematic diagram of an Identity Reel authorization process layout according to one embodiment.

FIG. 16 is a schematic diagram of an Identity Reel authorization process 1600 layout according to one embodiment. The Identity Reel Authorization process uses a one-time ephemeral token that is requested by the subscriber from an Identity Reel Hub and then physically (verbally, handwritten, typed, etc.) passes that token onto an inquiring agency to be used when that inquiring agency makes a request to an entity, such as a credit bureau who are being requested to provide personal credit information on the subscriber. To ensure that the subscriber is who they say they are and that they are authorizing this personal information check, the credit bureau will pass that token along with the subscriber identity to the Identity Reel Hub, which will either confirm or deny the request back to the credit bureau which will then take the appropriate action based on the returned information. If this is not a valid request or token, then the subscriber will be notified of the attempt to gain their personal information.

All transmissions between the subscriber and the Identity Reel Hub and between the Identity Reel Hub and the agencies' systems can be performed in an encrypted Zero Trust environment to prevent any exposure of personal information or tokens. Similarly, all data at rest will be encrypted.

Identity Reel Authorization process is more like a Reliance Authentication whereby a second entity relies upon the authentication token put in place by the subscriber. This would then be used by the second entity to combine with other personal information to make the request of a third entity (such as credit bureau) and then verifies back to the subscriber's initial authorization and this is where the Identity Reel Authorization process differs from a normal Reliance Authentication process.

While a number of authentication applications use a mobile application to store tokens and provide authorization, the Identity Reel process differs as the mobile application is used to verify the subscriber making the request and provide a RID-Token to the subscriber which is generated from the Reel ID Key (RID-Token) at the Reel Hub (e.g., see description of FIG. 14). This is then physically (verbally) passed by the subscriber to the inquiring agency to be used by them when making a request to an entity such as a credit bureau. A Zero Trust certificate (e.g., X.509) is stored on the subscriber's mobile device to authenticate the application and which can be valid for a period of up to one year at a time before it is required to be renewed or until revoked if the subscriber's subscription to the Identity Reel service has lapsed or been terminated.

Using such a device certificate helps protect the Identity Reel service from unauthorized access by various methods such as a cloned mobile device. If authentication succeeds (e.g., see descriptions of FIGS. 12-15), the device and associated subscriber are granted access to Identity Reel and associated services.

Furthermore, unlike other types of authorization applications that rely on making changes to all requesting entity applications which makes it difficult to get a high market penetration, and thus is costly. The Real authorization process instead relies upon a simpler approach requiring very minor changes to the web-based (HTML) interfaces used for entities such as credit inquiries by the credit agencies. This change requires that only a few additional fields; Reel-UID and RID-Token on the normal credit request screen and which are sent to the credit bureau along with all the previous information that would normally have been sent.

The agency will have to add some additional code to their normal process handling as per the swim lanes diagrams (e.g., see descriptions of FIG. 15) to pass this information to the reel hub for verification. The reel hub will either pass an approved or rejected response back to the requesting agency. It will then be up to the agency to process the data and report back to the requesting entity in its normal fashion and if potentially fraudulent, let the requesting agency know so they may, if they choose, to take the appropriate action. If it is a potentially fraudulent request, the reel hub will send a message to the registered user informing them of the potentially fraudulent request so that they can take appropriate action.

Figure 17:
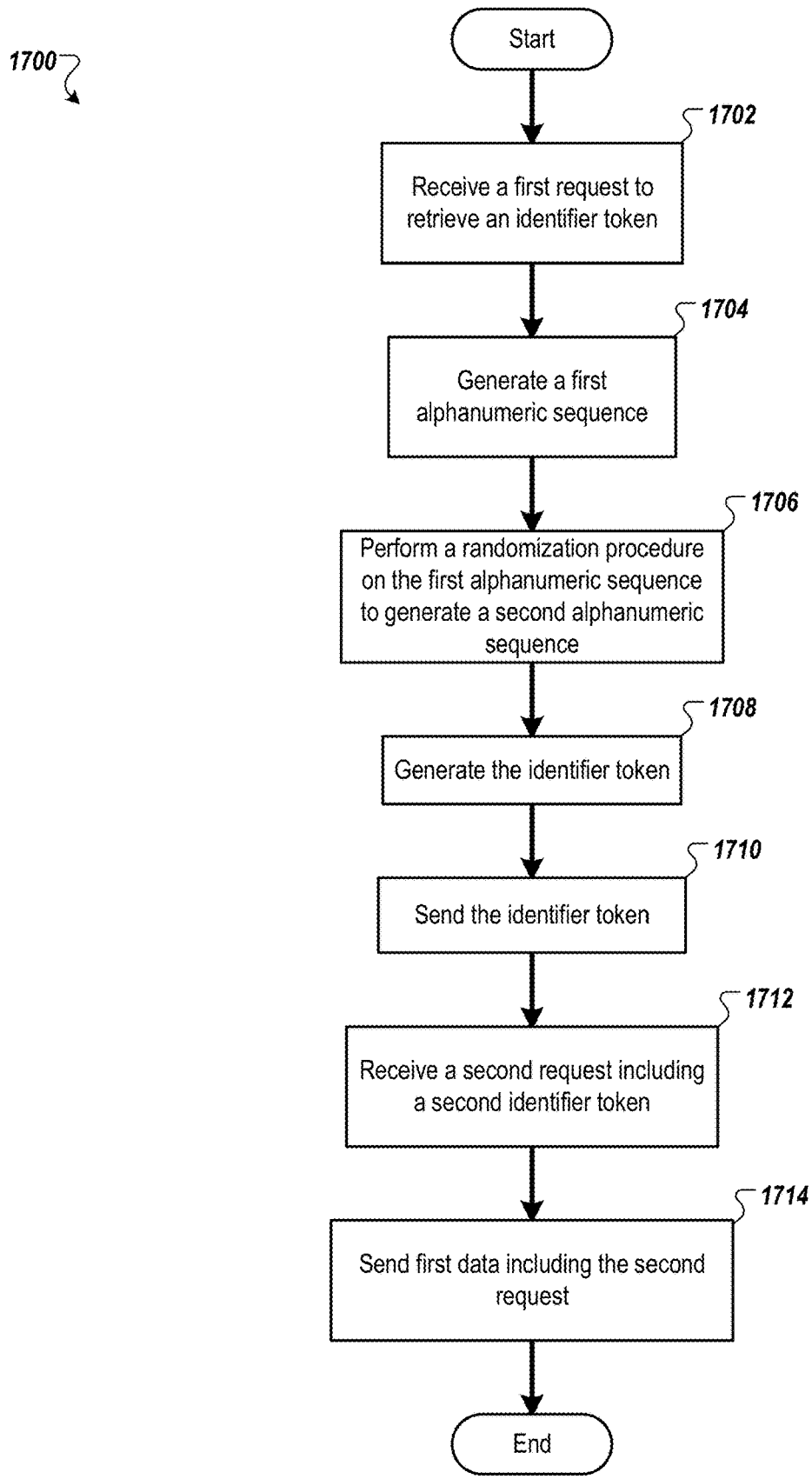
FIG. 17 is a flow diagram of a method of a consent-based authorization system according to one embodiment.

FIG. 17 is a flow diagram of a method 1700 of a consent-based authorization system according to one embodiment. Method 1700 can be performed by processing logic comprising hardware, firmware, or any combination thereof. Method 1700 can be performed at least by processing logic of the data structure 200 of the consent-based authorization system of FIG. 2.

Referring back to FIG. 17, the method 1700 of a consent-based authorization system begins with the processing logic receiving a first request to retrieve an identifier token (block 1702). In some embodiments, the first request can be from a first device. The identifier token can be associated with a user account. The processing logic generates a first alphanumeric sequence (block 1704). The first alphanumeric sequence may be associated with the user account. The processing logic can perform a randomization procedure on the first alphanumeric sequence to generate a second alphanumeric sequence (block 1706). The second alphanumeric sequence is associated with the user account. The processing logic generates the identifier token (block 1708). The identifier token includes at least the second alphanumeric sequence. The processing logic sends the identifier token, for example to the first device (block 1710). A subscriber (for example, to the consent-based authorization system) associated with the user account can supply the identifier token to a second device. The processing logic receives from a third device, a second request which includes a second identifier token with a third alphanumeric sequence (block 1712). The second request can be associated with performing an action, such as a data exchange, using sensitive data associated with the user account. The processing logic sends first data including the second request to the third device (block 1714).

In some embodiments, the first device may be a user device (such as a mobile phone, a computer, a tablet, or the like) of the subscriber. The first alphanumeric sequence, the second alphanumeric sequence, and the third alphanumeric sequence can each contain nine alphanumeric characters, or in other embodiments, each alphanumeric sequence can contain a different number of alphanumeric characters. The second device may be a user device associated with an entity with which the subscriber is attempting the action, which may be a financial transaction or an exchange of data. The third device may be a device associated with a credit bureau or other entity which can access the subscriber's sensitive information (e.g., social security number, credit card number, etc.).

In further embodiments, the processing logic can determine that the identifier token and the second identifier token match based on the second alphanumeric sequence and the third alphanumeric sequence. For example, the processing logic may compare each alphanumeric character of the second alphanumeric sequence to each alphanumeric character of the third alphanumeric sequence. When the processing logic determines that the identifier token and the second identifier token match, and the processing logic sends the first data, the processing logic can include the sensitive information in the first data, and the first data can further contain information that authorizes the second request (e.g., to perform the action). If the processing logic determines that the identifier token and the second identifier token do not match based at least on the second alphanumeric sequence and the third alphanumeric sequence, the processing logic can include information, such as a notification or a flag, that the second request may be fraudulent. In this way, either the subscriber associated with the user account, and/or the entity such as the credit bureau may be alerted to the fraudulent second request, via the first device and/or the third device respectively.

In further embodiments, the processing logic receives a third request from the first device. The third request may be to create the user account. In some embodiments, the user account must be created prior to the subscriber accessing the consent-based authorization system and requesting the identifier token. The processing logic generates the first alphanumeric sequence responsive to creating the user account.

In further embodiments, the processing logic generates a user identifier (ID) and a user log responsive to creating the user account. The processing logic can store second data including the first request and the second request in the user log. The user log can store other information associated with the user account, including the first alphanumeric sequence and the second alphanumeric sequence.

In further embodiments, the processing logic, in order to generate the identifier token, determines the second alphanumeric sequence based on the first alphanumeric sequence in response to receiving the first request.

In further embodiments, the processing logic, in order to send the first data to the third device, determines that a first ID associated with the second device and a second ID associated with the second device match. For example, the first request from the first device may include the first ID, which can be a name of a business, an employer identification number (EIN), or the like that is associated with the second device. Similarly, the second request from the third device may include a name of a business, an EIN, or the like that is associated with the second device. In some cases, this allows the processing logic to validate the second request.

In some embodiments, the processing logic receives information including a time duration defining a length of time that the identifier token is valid. For example, the subscriber associated with the user account can define the time duration and include the time duration in the first request. In some embodiments, the time duration may be a predetermined length of time. For example, the time duration may be defined at fifteen minutes, and thus the identifier token may expire and become invalid fifteen minutes after being generated.

In some embodiments, the processing logic generates a fourth alphanumeric sequence and performs the randomization procedure on the first alphanumeric sequence using the fourth alphanumeric sequence as a random seed value to start the randomization procedure. The first alphanumeric sequence and the second alphanumeric sequence can be generated by an individual reel as described herein, and the fourth alphanumeric sequence can be generated by a master reel. The identity validation may include a number of individual reels, each corresponding to a different user account. The master reel generates a random alphanumeric sequence (e.g., the fourth alphanumeric sequence) for each individual reel, which is used to seed the randomization procedure for each corresponding individual reel. In such a way, no two individual reels are identical.

Figure 18:
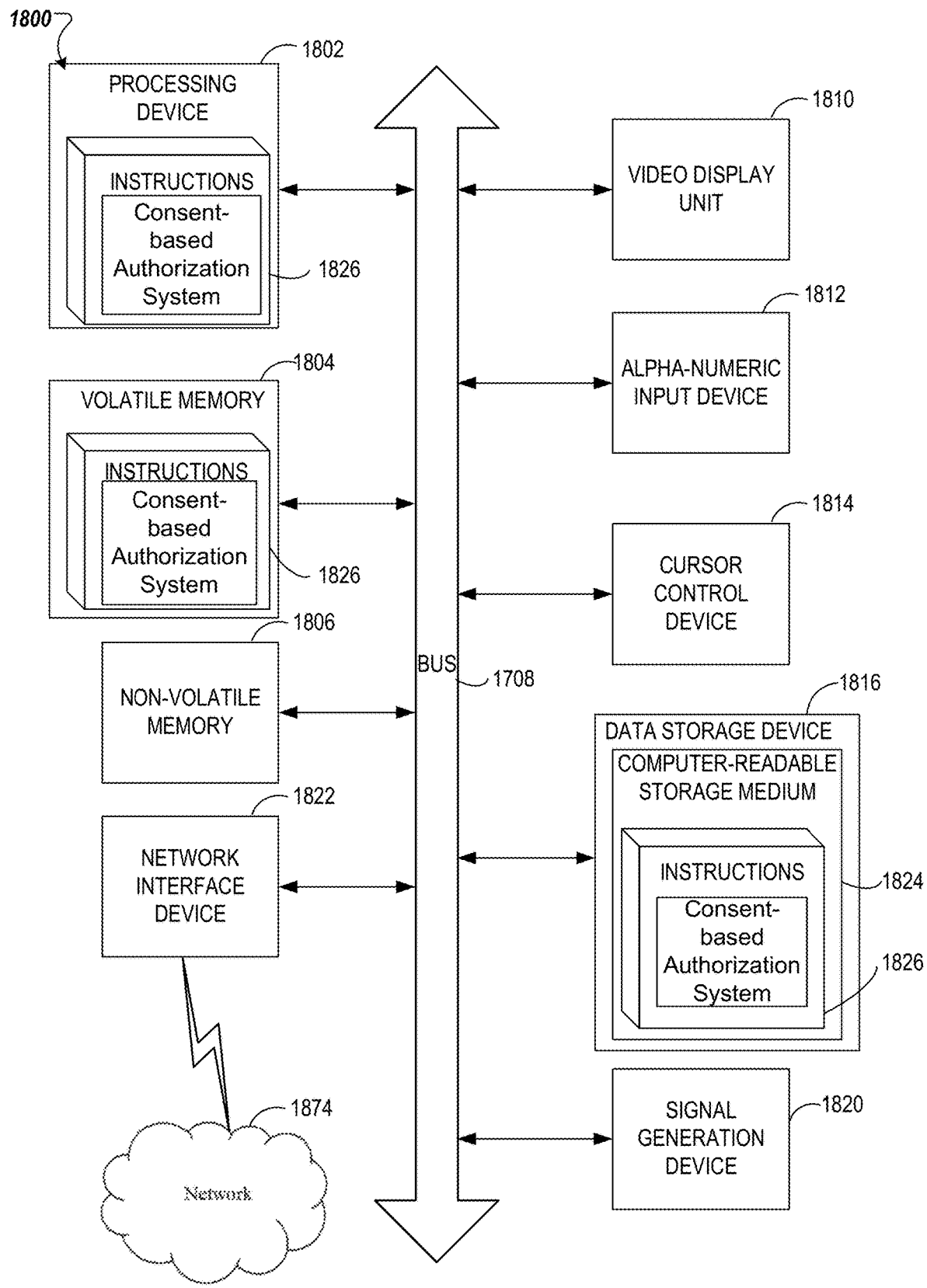
FIG. 18 depicts a block diagram of a machine in the form of a computer system within which a set of instructions, for causing the machine to perform any one or more of the methodologies discussed herein, may be executed.

FIG. 18 depicts a block diagram of a machine in the form of a computer system 1800 within which a set of instructions, for causing the machine to perform any one or more of the methodologies discussed herein, may be executed. In various illustrative examples, computer system 1800 may correspond to a processing device within a consent-based authorization system including one or more data structures 200 of FIG. 2. The computer system 1800 may be included within a data center that supports virtualization. Virtualization within a data center results in a physical system being virtualized using virtual machines to consolidate the data center infrastructure and increase operational efficiencies.

A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 1800 may be connected (e.g., via a network, such as a Local Area Network (LAN), an intranet, an extranet, or the Internet) to other computer systems. Computer system 1800 may operate in the capacity of a server or a client computer in a client-server environment, or as a peer computer in a peer-to-peer or distributed network environment. Computer system 1800 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein for live storage domain decommissioning.

In a further aspect, the computer system 1800 may include a processing device 1802, a volatile memory 1804 (e.g., random access memory (RAM)), a non-volatile memory 1806 (e.g., read-only memory (ROM) or electrically-erasable programmable ROM (EEPROM)), and a data storage device 1816, which may communicate with each other via a bus 1808.

Processing device 1802 may be provided by one or more processors such as a general-purpose processor (such as, for example, a complex instruction set computing (CISC)

microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application-specific integrated circuit (ASIC), a field-programmable gate array (FPGA), a digital signal processor (DSP), or a network processor).

Computer system 1800 may further include a network interface device 1822. Computer system 1800 also may include a video display unit 1810 (e.g., an LCD), an alphanumeric input device 1812 (e.g., a keyboard), a cursor control device 1814 (e.g., a mouse), and a signal generation device 1820.

Data storage device 1816 may include a non-transitory computer-readable storage medium 1824 on which may store instructions 1826 encoding any one or more of the methods or functions described herein, including instructions encoding identity validation system for implementing methods 300-400 of FIGS. 3-4, 800-1500 of FIGS. 8-15, and 1900-2000 of FIGS. 19-20 for a consent-based authorization system.

Instructions 1826 may also reside, completely or partially, within volatile memory 1804 and/or within processing device 1802 during execution thereof by computer system 1800, hence, volatile memory 1804 and processing device 1802 may also constitute machine-readable storage media.

Figure 19A:
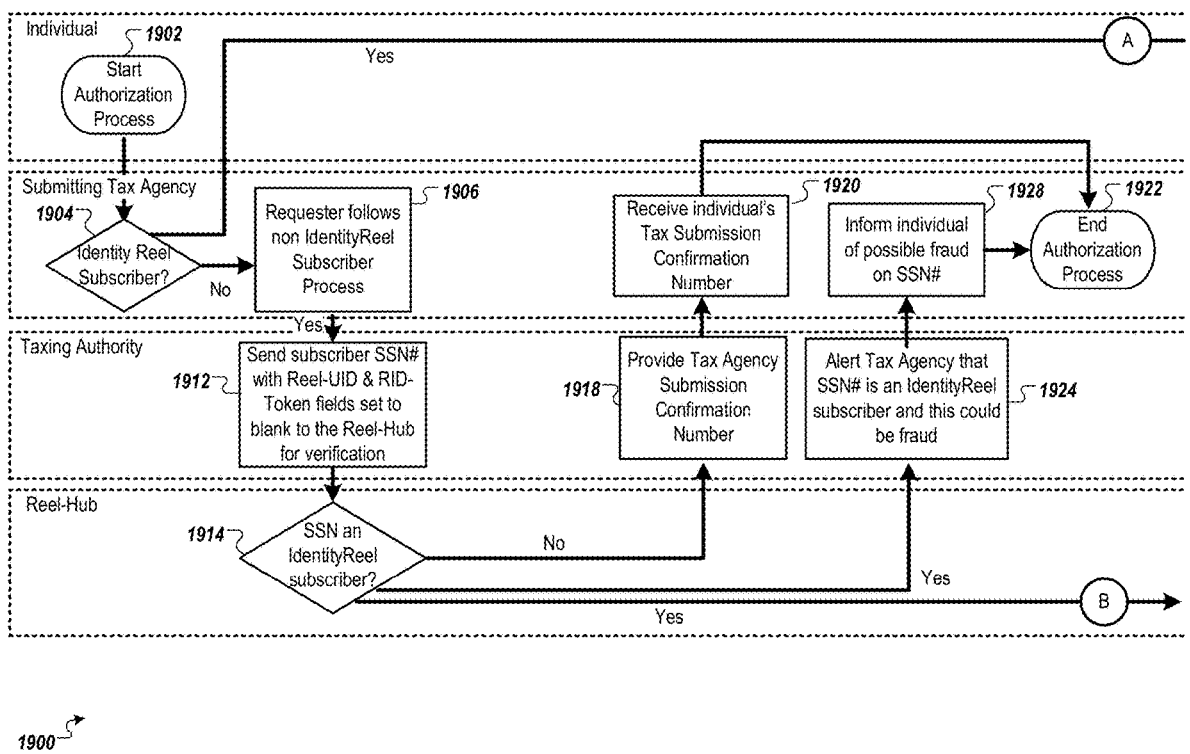
FIGS. 19A-B illustrate a flow diagram of an identity validation process corresponding to a tax-related request according to one embodiment.
Figure 19B:
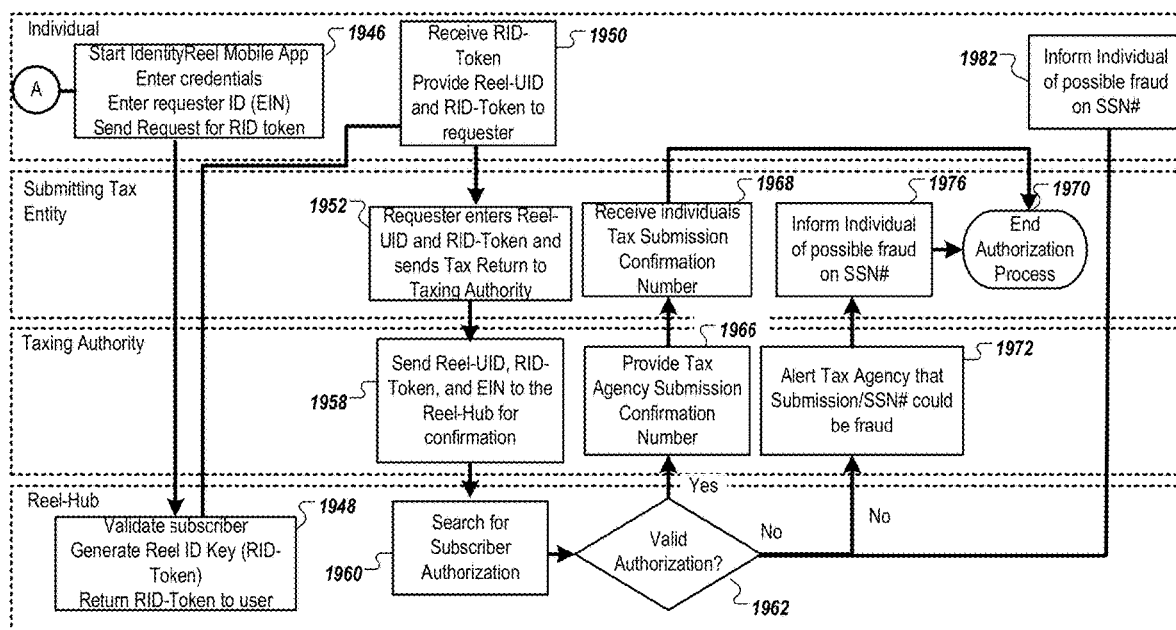

FIGS. 19A-B illustrate a flow diagram of an identity validation process (method 1900) corresponding to a tax-related request according to one embodiment. It should be noted that one aspect of the approach for the authorization process is the use of a "reliance authentication" rather than a Multi-Factor (MFA) or Two-Factor (2FA) process. MFA and/or 2FA are methods in which a user is granted access to a system after presenting two or more "factors" to that system's authentication mechanism. This is usually something that a user has or knows, or somewhere that they are. These methods are used to directly access a particular system which is not the case during the Identity Reel process. Method 1900 can be performed by processing logic comprising hardware, firmware, or any combination thereof. Method 1900 can be performed by processing logic of the data structure 200 of the consent-based authorization system of FIG. 2

FIG. 19A relates to a case in which an individual who is not a subscriber to the consent-based authorization system attempts to initiate/process a tax-related request (e.g., filing a tax return, tax related-submission). It should be noted that lettered circles (e.g., A-B) indicate flowchart lines that are extended between FIGS. 19A-19B. A tax-return (e.g., a tax-return submission) can be initiated by an individual (e.g., through a submitting tax agency and/or a tax return preparation entity) who may or may not be a subscriber to a consent-based authorization system (block 1902). In a first example, the individual is not a subscriber to the consent-based authorization system (determined at block 1904 by a requesting organization). The requesting organization can be a mobile application on the subscriber's user device for example. However, the individual can still follow a process that is designed for individuals who have not subscribed to identity reel but still would like to initialize a secure identity validation associated with a tax-related request (associated with preparation of tax-related requests) (block 1906). The submitting tax agency provides data (e.g., through a formal tax return submission) to a taxing authority (block 1912).

If the individual is using a tax preparation service and/or submitting tax agency, then the third-party agency can format a tax-related request (e.g., a formal tax return submission) which can be sent to the taxing authority (block 1906). The taxing authority then receives the tax-related request and can send a social security number of the individual, along with a user ID and identifier token fields (which are, by default, blank) to the reel hub for verification (block 1912). The reel hub then checks whether or not the social security number of the individual corresponds to a consent-based authorization system subscriber (block 1914).

If the social security number does not correspond to a subscriber of the consent-based authorization system, the reel hub can still provide the third-party agency tax information associated with the tax-related request (e.g., a submission confirmation number) and associated with the individual (block 1918). The taxing authority then formats the submission information and sends it back to the submitting tax agency (block 1920), which receives and processes the individual's tax submission confirmation number (block 1920), at which the authorization process ends (block 1922).

However, on the other hand, if the social security number received by the reel hub corresponds to a subscriber of the consent-based authorization system, while the credit check authorization had been initialized by an individual who was not a subscriber of the consent-based authorization system (e.g., as determined in block 1904), then the taxing authority can alert the submitting tax agency that the social security number belongs to a consent-based authorization system subscriber, and thus the request could be potentially fraudulent (block 1924). This allows the submitting tax agency to be alerted and determine an appropriate response to the tax-related request from the individual (block 1928). In some cases, the third-party agency determines to assume that the request was fraudulent and to inform the individual as such and decline the tax-related request (block 1928) and end the authorization process (block 1922).

FIG. 19B relates to a case in which an individual who is a consent-based authorization system subscriber attempts to initiate a tax-related request with a taxing authority. At block 1904, the requesting organization can determine that the individual is a subscriber. Thus, the individual can start their mobile application for the consent-based authorization system, for example on their user device or mobile device, and enter credentials (such as an EIN), which are used to validate the subscriber and send the reel hub a request for an identifier token (block 1946). The reel hub receives the request and validates the subscriber based on the credentials. Upon validating the subscriber, the reel hub generates an identifier token that can be returned to the individual (block 1948). The individual receives the identifier token and can then provide the identifier token as well as their user ID to a submitting tax entity (block 1950) which then needs submitting the tax-related request to the taxing authority (block 1952).

If the individual would like to use, the requesting submitting tax entity can receive the user ID and the identifier token from the individual and format the tax-related request (e.g., a tax return submission) and send that to the taxing authority (block 1952). The taxing authority then send the user ID, the identifier token, and the EIN to the reel hub for verification (block 1958). In some embodiments the tax authority sends an action ID that corresponds to a tax-related procedure (e.g., tax return procedure). The reel hub then searches for a subscriber authorization (block 1960). If the authorization is valid (block 1992), then the taxing authority can provide the submitting tax entity the tax information (e.g., a tax submission confirmation number (block 1966). The submitting tax entity formats the tax information and sends it back to the individual (block 1968). The requesting organization receives the individual's credit information, processes it (block 1968), and ends the authorization process (block 1970).

However, on the other hand, if at block 1962, the reel hub determines that the subscriber authorization is not valid, the taxing authority can alert the submitting tax entity that the tax-related request could be fraudulent (block 1972). For example, the taxing authority can alert the submitting tax entity that the a corresponding tax-related request corresponds to an unauthorized submission. The credit bureau can send that information to the third-party agency which then determines an appropriate response to the ax-related request (block 1974), which may including informing the submitting tax entity (e.g., a tax return submission entity) that the individual's tax-related request is declined (block 1976), at which point the authorization process is ended (block 1968). Furthermore, if the individual is a subscriber to the consent-based authorization system, they are alerted of a potential fraud (block 1982).

In some embodiments, a tax-related request may include any tax-related inquiry, request for action, formal and/or informal submission relating to an individual's and/or organizations status as a taxpayer, performance of paying taxes, and/or relationship to a taxing authority. For example, a tax-related request may include processing a formal tax return submission. In another example, a tax-related request may include updating and/or accessing data associated with a user profile corresponding to a submitting tax entity and/or taxing authority. In another example, the submitting tax agency may receive a submission confirmation identification (ID) upon validation of the identity of the individual.

Figure 20A:
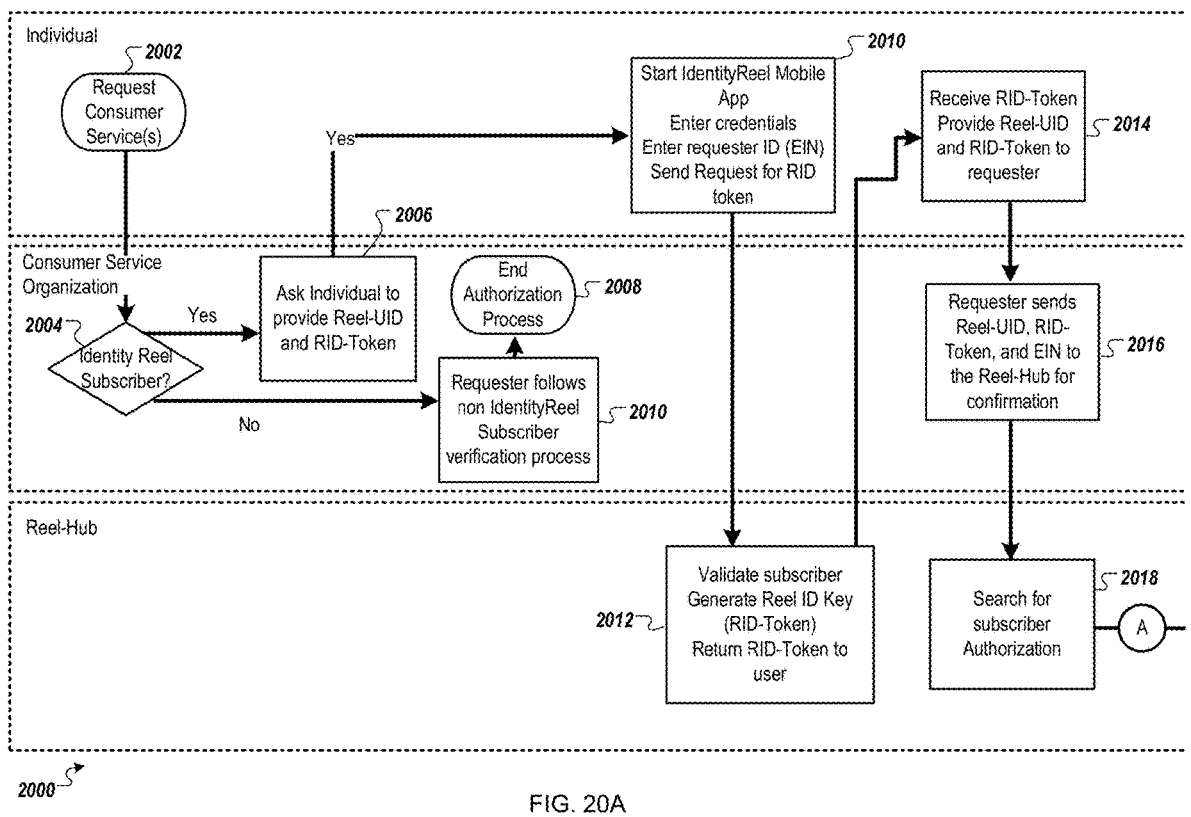
FIGS. 20A-B illustrate a flow diagram of an identity validation process corresponding to consumer service operations according to one embodiment.
Figure 20B:
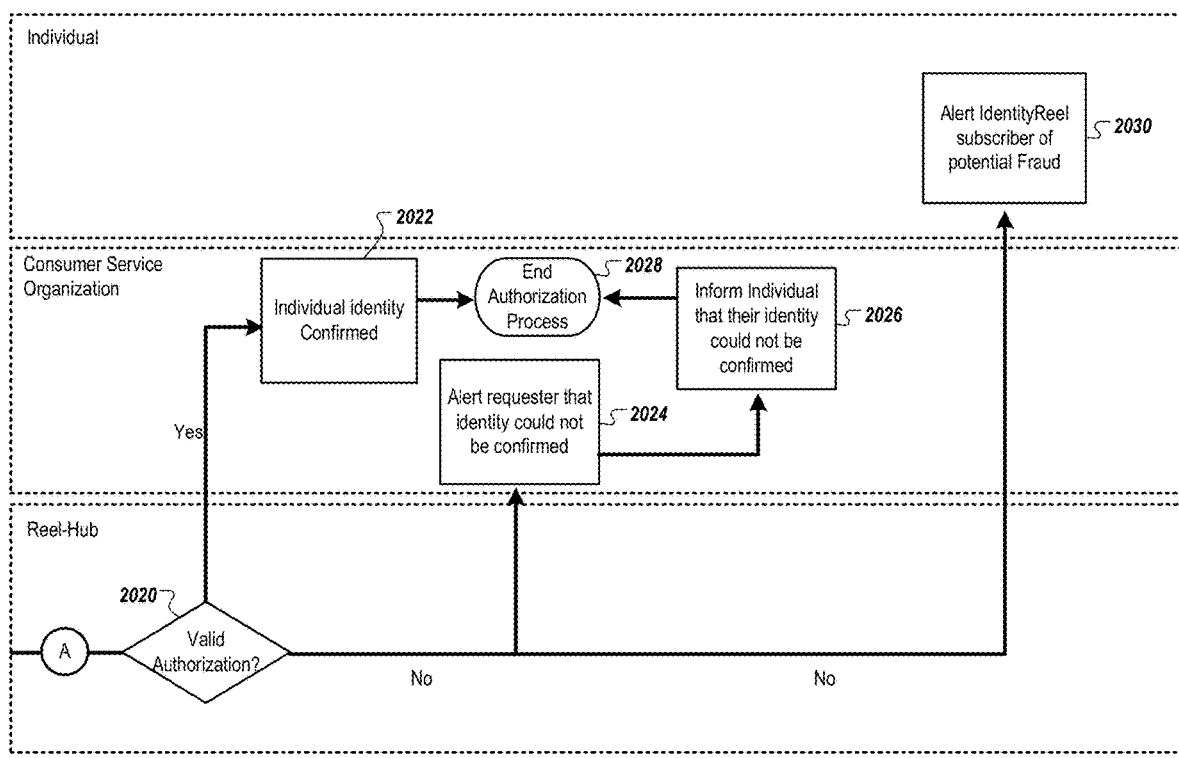

FIGS. 20A-B illustrate a flow diagram of an identity validation process corresponding to consumer service operations according to one embodiment. It should be noted that one aspect of the approach for the authorization process is the use of a "reliance authentication" rather than a Multi-Factor (MFA) or Two-Factor (2FA) process. MFA and/or 2FA are methods in which a user is granted access to a system after presenting two or more "factors" to that system's authentication mechanism. This is usually something that a user has or knows, or somewhere that they are. These methods are used to directly access a particular system which is not the case during the Identity Reel process. Method 2000 can be performed by processing logic comprising hardware, firmware, or any combination thereof. Method 2000 can be performed by processing logic of the data structure 200 of the consent-based authorization system of FIG. 2

FIG. 20A-B relate to a case in which an individual may or may not be a subscriber to the consent-based authorization system interacts with a consumer service. It should be noted that lettered circles (e.g., A) indicate flowchart lines that are extended between FIGS. 20A-20B. Consumer service processes can be initiated by an individual who may or may not be a subscriber to a consent-based authorization system (block 2002). In a first example, the individual is not a subscriber to the consent-based authorization system (determined at block 2004 by a requesting organization). The consumer service organization can be a mobile application on the subscriber's user device for example. At block 2004, processing logic may determine that the individual is not a subscriber to the reel-hub service and provide the user an opportunity to subscribe (block 2010). In some embodiments, the consumer service request 2002 may include accessing a user account, accessing and/or updating sensitive data associated with the user account, carrying out a transaction associated with a consumer service, and/or the like.

In some embodiments, a consumer service may include entities that provide a variety of goods and services to end-users. For example, a consumer service may include, but not be limited to, restaurants travel, club good, media, events, culture, information technology (IT), transportation, ecommerce, finance, insurance, leasing, utilities, leisure, quality of life, creative services, professional services, products as a service, and/or the like. For example, processing requests, carrying out functions, participating in transaction associated with one or more of the above illustrated consumer services.

At block 2004, the requesting organization (e.g., consumer service organization) can determine that the individual is a subscriber. At block 2006, the consumer service organization can ask the individual to provide the Reel-UID and RIK-Token. For example, the individual can start their mobile application for the consent-based authorization system, for example on their user device or mobile device, and enter credentials (such as an EIN), which are used to validate the subscriber and send the reel hub a request for an identifier token (block 2010). The reel hub receives the request and validates the subscriber based on the credentials (block 2012). Upon validating the subscriber, the reel hub generates an identifier token that can be returned to the individual (block 2014). The individual receives the identifier token and can then provide the identifier token as well as their user ID to the requesting organization (block 2014) which then sends the Reel token and requester ID (e.g., EIN, consumer service entity ID, etc.) to the Reel-hub block 2016). In some embodiments, the consumer service organization can then format the individuals request (e.g., generate a formal identity validation request), which can then send the user ID, the identifier token, and the EIN to the reel hub for verification. In some embodiments, the consumer service organization sends a consumer service ID.

FIG. 20B illustrates the remaining portion of the identity validation process initiated in FIG. 20A. The reel hub receives the validation request from circle A connecting to FIG. 20A and searches for a subscriber authorization (block 2020). If the authorization is valid, then the consumer service organization can provide the individual an indication that the identity validation request is validated (block 2022). The consumer service organization may continue processing the request associated with the identity validation request, and ends the authorization process (block 2028).

However, on the other hand, if at block 2020, the reel hub determines that the subscriber authorization is not valid, the reel hub can alert the consumer service organization that the identity could not be confirmed (block 2024). Reel hub can send an alert to the third-party consumer service organizations which then determines an appropriate response to the individual (block 2026), at which point the authorization process is ended (block 2028). Furthermore, if the individual is a subscriber to the consent-based authorization system, they are alerted of a potential fraud (block 2030).

Various embodiments of the identification validation system described herein may include various operations. These operations may be performed and/or controlled by hardware components, digital hardware and/or firmware, and/or combinations thereof. Certain embodiments may be implemented by firmware instructions stored on a non-transitory computer-readable medium, e.g., such as volatile memory and/or non-volatile memory. These instructions may be used to program and/or configure one or more devices that include processors (e.g., CPUs) or equivalents thereof (e.g., such as processing cores, processing engines, microcontrollers, and the like), so that when executed by the processor(s) or the equivalents thereof, the instructions cause the device(s) to perform the described operations for identity validation described herein. The non-transitory computer-readable storage medium may include, but is not limited to, electromagnetic storage medium, read-only memory (ROM), random-access memory (RAM), erasable programmable memory (e.g., EPROM and EEPROM), flash memory, or another now-known or later-developed non-transitory type of medium that is suitable for storing information.

Although the operations of the circuit(s) and block(s) herein are shown and described in a particular order, in some embodiments the order of the operations of each circuit/block may be altered so that certain operations may be performed in an inverse order or so that certain operation may be performed, at least in part, concurrently and/or in parallel with other operations. In other embodiments, instructions or sub-operations of distinct operations may be performed in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method, comprising:
   receiving, by a first server from a first computing device, first data indicating (i) a tax-related request and (ii) an authorization token each associated with a first user, wherein the authorization token is a static, randomly-generated alphanumeric sequence based on a plurality of continuously randomized register values;
   sending, by the first server to a second server, an identity validation request identifying the first user and the tax-related request, wherein the identity validation request comprises the authorization token;
   receiving, by the first server from the second server, a response to the identity validation request; and
   sending, by the first server to the first computing device, second data corresponding to the response to the identity validation request such that the tax-related request is secure.

2. The method of claim 1, wherein the second data indicates a submission confirmation identification (ID) associated with the tax-related request.

3. The method of claim 1, wherein the second data indicates an unauthorized submission of the tax-related request.

4. The method of claim 1, wherein the identity validation request comprises a social security number associated with the first user.

5. The method of claim 1, wherein the first computing device is associated with a tax return submission entity and the first server corresponds to a taxing authority.

6. The method of claim 1, wherein the tax-related request corresponds to a tax-return submission associated with the first user.

7. The method of claim 1, wherein prior to the first server receiving the first data, the method further comprises:

receiving, by the second server from a second computing device corresponding to the first user, third data indicating the first user and the tax-related request; and
sending, by the second server to the second computing device, the authorization token.

8. A method, comprising:
   receiving, by a server from a first computing device associated with a first user ID, a first request to retrieve a first authorization token, wherein the first authorization token is a static, randomly-generated alphanumeric sequence based on a plurality of continuously randomized register values and the first request indicates a taxing authority identification (ID) associated with the first authorization token;
   generating, by the server, the first authorization token;
   sending, by the server to the first computing device, the first authorization token;
   responsive to sending the first authorization token to the first computing device, receiving, by the server from a second computing device, an identity validation request comprising (i) a second user ID, (ii) a second authorization token, and (iii) an agency ID; and
   validating, by the server, the identity validation request based on (i) a first comparison between the first user ID and the second user ID, (ii) a second comparison between the first authorization token and the second authorization token, and (iii) a third comparison between the taxing authority ID and the agency ID such that the first request is secure.

9. The method of claim 8, wherein:
   the first request further comprises a first action ID, wherein the first action ID indicates a procedure performed by a taxing authority corresponding to the taxing authority ID using data associated with the first user ID; and
   the identity validation request further comprises a second action ID, wherein validating the identity validation request is further based on a fourth comparison between the first action ID and the second action ID.

10. The method of claim 9, wherein at least one of the first action ID or the second action ID corresponds to a tax return procedure associated with at least one of the first user ID or the second user ID.

11. The method of claim 9, wherein responsive to the server validating the identity validation request, the method further comprises:
   sending, by the second computing device to a third computing device associated with preparation of tax-related requests, a submission confirmation identification (ID) associated with a tax-related request.

12. A method, comprising:
   receiving, by a first server from a first computing device, first data indicating (i) a consumer service request, (ii) a consumer service entity identification (ID), and (iii) an authorization token each associated with a first user, wherein the authorization token is a static, randomly-generated alphanumeric sequence based on a plurality of continuously randomized register values;
   sending, by the first server to a second server, an identity validation request identifying the first user, wherein the identity validation request comprises the consumer service entity ID and the authorization token;
   receiving, by the first server from the second server, a response to the identity validation request; and
   causing, by the first server, an action to be performed responsive to receipt of the response to the identity validation request, wherein the action corresponds to the consumer service request such that the consumer service request is secure.

13. The method of claim 12, wherein the identity validation request further indicates an action ID associated with the consumer service request.

14. The method of claim 12, wherein the consumer service request corresponds to at least one of accessing or updating a user profile comprising sensitive data, wherein the user profile is associated with the consumer service entity ID and the first user.

15. The method of claim 12, wherein the consumer service request corresponds to performing a transaction associated with (i) a consumer service entity corresponding to the consumer service entity ID and (ii) a user account corresponding to the first user.

16. The method of claim 12, wherein the consumer service entity ID corresponds to an employer identification number (EIN).

17. The method of claim 12, wherein the consumer service request corresponding to preparation of a tax return and the consumer service entity ID corresponds to a tax return preparation entity.

18. The method of claim 12, wherein the consumer service request corresponds to a tax-related request and the consumer service entity ID corresponds to a taxing authority.

19. The method of claim 12, wherein prior to the first server receiving the first data, the method further comprises:
receiving, by the second server from a second computing device corresponding to the first user, third data indicating the first user and the consumer service request; and
sending, by the second server to the second computing device, the authorization token.

20. The method of claim 12, further comprising:
sending, by the first server to a second computing device associated with the first user, an alert indicating the consumer service request.

\* \* \* \* \*